(12) United States Patent
Haynes, III et al.

(10) Patent No.: US 8,583,469 B2
(45) Date of Patent: Nov. 12, 2013

(54) FACILITATING GROWTH INVESTMENT DECISIONS

(75) Inventors: James M. Haynes, III, San Francisco, CA (US); Anthony W. Ulwick, Aspen, CO (US)

(73) Assignee: Strategyn Holdings, LLC, Boynton Beach, FL (US)

( * ) Notice: Subject to any disclaimer, the term of this patent is extended or adjusted under 35 U.S.C. 154(b) by 38 days.

(21) Appl. No.: 13/020,546

(22) Filed: Feb. 3, 2011

(65) Prior Publication Data

US 2011/0218837 A1    Sep. 8, 2011

Related U.S. Application Data

(60) Provisional application No. 61/310,268, filed on Mar. 3, 2010.

(51) Int. Cl.
*G06Q 10/00* (2012.01)

(52) U.S. Cl.
USPC ........................................................ 705/7.31

(58) Field of Classification Search
USPC ........................................................ 705/7.31
See application file for complete search history.

(56) References Cited

U.S. PATENT DOCUMENTS

| | | |
|---|---|---|
| 4,885,685 A | 12/1989 | Wolfberg et al. |
| 4,894,773 A | 1/1990 | Lagarias |
| 4,924,386 A | 5/1990 | Freedman et al. |
| 4,992,940 A | 2/1991 | Dwarkin |
| 4,996,642 A | 2/1991 | Hey |
| 5,009,626 A | 4/1991 | Katz |
| 5,041,972 A | 8/1991 | Frost et al. |
| 5,111,392 A | 5/1992 | Malin |
| 5,122,952 A | 6/1992 | Minkus |
| 5,124,911 A | 6/1992 | Sack |
| 5,164,897 A | 11/1992 | Clark et al. |
| 5,182,793 A | 1/1993 | Alexander et al. |
| 5,200,909 A | 4/1993 | Juergens |
| 5,251,294 A | 10/1993 | Abelow |
| 5,267,146 A | 11/1993 | Shimizu et al. |
| 5,297,054 A | 3/1994 | Kienzle et al. |
| 5,299,115 A | 3/1994 | Fields et al. |
| 5,317,503 A | 5/1994 | Inoue |
| 5,319,541 A | 6/1994 | Blanchard et al. |
| 5,351,186 A | 9/1994 | Bullock et al. |
| 5,416,694 A | 5/1995 | Parrish et al. |
| 5,432,904 A | 7/1995 | Wong |

(Continued)

FOREIGN PATENT DOCUMENTS

| | | |
|---|---|---|
| EP | 0210742 | 2/1987 |
| FR | 2752934 | 3/1998 |

OTHER PUBLICATIONS

Co-pending U.S. Appl. No. 08/716,948, filed Sep. 20, 1996.
Co-pending U.S. Appl. No. 09/385,661, filed Aug. 27, 1999.

(Continued)

*Primary Examiner* — Romain Jeanty
(74) *Attorney, Agent, or Firm* — Sheppard, Mullin, Richter & Hampton LLP

(57) ABSTRACT

A technique for performing securable market analysis involves establishing an empirically-derived structure and evaluating market size using analytical techniques within that structure. Inputs to a system that incorporates the technique can include a functional job and related emotional and consumption jobs, if any; importance levels; satisfaction levels; job executors; and willingness-to-pay.

21 Claims, 10 Drawing Sheets

(56) References Cited

U.S. PATENT DOCUMENTS

| | | | |
|---|---|---|---|
| 5,634,021 | A | 5/1997 | Rosenberg et al. |
| 5,734,890 | A | 3/1998 | Case et al. |
| 5,842,193 | A | 11/1998 | Reilly |
| 5,963,910 | A | 10/1999 | Ulwick |
| 6,085,165 | A | 7/2000 | Ulwick |
| 6,115,691 | A | 9/2000 | Ulwick |
| 6,526,387 | B1 | 2/2003 | Ruffin et al. |
| 6,708,155 | B1 | 3/2004 | Honarvar et al. |
| 6,961,756 | B1 | 11/2005 | Dilsaver et al. |
| 7,039,654 | B1 | 5/2006 | Eder |
| 7,340,409 | B1 | 3/2008 | Ulwick |
| 7,533,035 | B1 | 5/2009 | Abend et al. |
| 7,664,670 | B1 | 2/2010 | Weiss |
| 8,214,244 | B2* | 7/2012 | Haynes et al. ............... 705/7.25 |
| 2002/0016727 | A1 | 2/2002 | Harrell et al. |
| 2002/0049621 | A1 | 4/2002 | Bruce |
| 2002/0099582 | A1 | 7/2002 | Buckley et al. |
| 2002/0120459 | A1 | 8/2002 | Dick et al. |
| 2002/0173998 | A1 | 11/2002 | Case |
| 2003/0033040 | A1 | 2/2003 | Billings |
| 2003/0033191 | A1 | 2/2003 | Davies et al. |
| 2003/0033192 | A1 | 2/2003 | Zyman et al. |
| 2003/0036947 | A1 | 2/2003 | Smith et al. |
| 2003/0083914 | A1 | 5/2003 | Marvin et al. |
| 2003/0110067 | A1 | 6/2003 | Miller et al. |
| 2003/0115094 | A1 | 6/2003 | Ammerman et al. |
| 2003/0135399 | A1 | 7/2003 | Ahamparam et al. |
| 2003/0139828 | A1 | 7/2003 | Ferguson et al. |
| 2003/0187707 | A1 | 10/2003 | Hack et al. |
| 2004/0093244 | A1 | 5/2004 | Hatcher et al. |
| 2004/0117234 | A1 | 6/2004 | Lindsay-Scott et al. |
| 2004/0143470 | A1 | 7/2004 | Myrick et al. |
| 2004/0193476 | A1 | 9/2004 | Aerdts |
| 2004/0204980 | A1 | 10/2004 | Swedberg et al. |
| 2004/0230397 | A1 | 11/2004 | Chadwick |
| 2004/0230464 | A1 | 11/2004 | Bliss et al. |
| 2004/0236621 | A1 | 11/2004 | Eder |
| 2005/0026119 | A1 | 2/2005 | Ellis et al. |
| 2005/0096950 | A1 | 5/2005 | Caplan et al. |
| 2005/0114829 | A1 | 5/2005 | Robin et al. |
| 2005/0240511 | A1 | 10/2005 | Chadwick et al. |
| 2006/0080326 | A1 | 4/2006 | Akbay et al. |
| 2006/0085255 | A1 | 4/2006 | Hastings et al. |
| 2006/0149764 | A1 | 7/2006 | Burchfield et al. |
| 2006/0200423 | A1 | 9/2006 | Powell |
| 2006/0206374 | A1 | 9/2006 | Asthana et al. |
| 2006/0277156 | A1 | 12/2006 | Merican |
| 2006/0287937 | A1 | 12/2006 | Flinn et al. |
| 2007/0038501 | A1 | 2/2007 | Lee et al. |
| 2007/0038627 | A1 | 2/2007 | Cohn et al. |
| 2007/0050198 | A1 | 3/2007 | Ledford et al. |
| 2007/0078692 | A1 | 4/2007 | Vyas |
| 2007/0083385 | A1 | 4/2007 | Patterson et al. |
| 2007/0083421 | A1 | 4/2007 | McNair et al. |
| 2007/0106520 | A1 | 5/2007 | Akkiraju et al. |
| 2007/0129981 | A1 | 6/2007 | Jang et al. |
| 2007/0156382 | A1 | 7/2007 | Graham et al. |
| 2007/0162316 | A1 | 7/2007 | Kratschmer et al. |
| 2007/0282666 | A1 | 12/2007 | Afeyan et al. |
| 2007/0282667 | A1 | 12/2007 | Cereghini et al. |
| 2008/0021844 | A1 | 1/2008 | Sanwal et al. |
| 2008/0114608 | A1 | 5/2008 | Bastien |
| 2008/0114628 | A1 | 5/2008 | Johnson et al. |
| 2008/0167936 | A1 | 7/2008 | Kapoor |
| 2008/0205692 | A1 | 8/2008 | Hinkle et al. |
| 2008/0208648 | A1 | 8/2008 | Linder et al. |
| 2008/0249825 | A1 | 10/2008 | Kunjur et al. |
| 2008/0294534 | A1 | 11/2008 | Brown et al. |
| 2008/0312980 | A1 | 12/2008 | Boulineau et al. |
| 2008/0313596 | A1 | 12/2008 | Kreamer et al. |
| 2008/0319811 | A1 | 12/2008 | Casey |
| 2009/0018891 | A1 | 1/2009 | Eder |
| 2009/0070160 | A1 | 3/2009 | Kasravi et al. |
| 2009/0112686 | A1 | 4/2009 | Sheehan et al. |
| 2009/0138322 | A1 | 5/2009 | Joyner et al. |
| 2009/0144127 | A1 | 6/2009 | Smith |
| 2009/0157569 | A1 | 6/2009 | Henby et al. |
| 2010/0070348 | A1 | 3/2010 | Nag |
| 2010/0125566 | A1* | 5/2010 | Gibbs et al. ................... 707/722 |
| 2011/0040750 | A1 | 2/2011 | Safra et al. |
| 2011/0161054 | A1 | 6/2011 | Woolf et al. |

OTHER PUBLICATIONS

Co-pending U.S. Appl. No. 08/763,668, filed Dec. 11, 1996.
Co-pending U.S. Appl. No. 13/319,066, filed Nov. 4, 2011.
Office Action mailed Oct. 7, 2011 from U.S. Appl. No. 12/253,433, filed Oct. 17, 2008.
Office Action mailed Nov. 16, 2011 from U.S. Appl. No. 12/476,160, filed Jun. 1, 2009.
Office Action mailed Dec. 20, 2011 from U.S. Appl. No. 12/592,715, filed Nov. 30, 2009.
Co-pending U.S. Appl. No. 12/476,160, filed Jun. 1, 2009.
Co-pending U.S. Appl. No. 12/563,969, filed Sep. 21, 2009.
Co-pending U.S. Appl. No. 10/235,285, filed Sep. 5, 2002.
Co-pending U.S. Appl. No. 12/592,715, filed Nov. 30, 2009.
Co-pending U.S. Appl. No. 09/652,576, filed Aug. 31, 2000.
Co-pending U.S. Appl. No. 12/253,433, filed Oct. 17, 2008.
Co-pending U.S. Appl. No. 12/800,652, filed May 18, 2010.
GartnerGroup Executive Services, "Executive Market Analysis Program, Today's Market Program demandS Better Analysis", pp. 11-36 (first provided to clients in Nov. 1993).
Saaty, "Decision Making for Leaders", pp. 1-33, 1988.
Vincze, "Expert Choice", pp. 10-12, Mar. 1990.
Von Hippel, "Democratizing Innovation", MIT Press, Apr. 2005.
Chesbrough, "Open Innovation, The New Imperative for Creating and Profiting from Technology", Harvard Business School Press, 2003.
Harrison et al., "Edison in the Boardroom. Moving Beyond Intellectual Capital to I-Stuff", John Wiley & Sons, Inc., 2006.
Davis et al., "Edison in the Boardroom, How Leading Companies Realize Value from Their Intellectual Assets", John Wiley * Sons, 2001.
Fuelling, "Manufacturing, Selling and Accounting: Patenting Business Methods", 76 Journal of the Patent and Trademark Office Society, pp. 471-507, Jul. 1994.
Ulwick, "Turn Customer Input into Innovation", Harvard Business Review, pp. 5-11, Jan. 2002.
Lyman et al., "Deployment Normalization", International TechneGroup Incorporation, pp. 1-7, 1990.
Strategyn, Inc., "CD-MAP®, An Advanced Technology for Strategy Formulation", pp. 1-37, 1998.
Strategyn, Inc., "Sample Project Reports, Presenting the Results of a CD-MAP®, XYZ Company, CD-MAP® Project Final Report, Formulating a Strategy to Improve the Product Development Process:, pp. 1-26 and XYZ Company, CD-MAP® Project Final Report, Evaluating the Attractiveness of Alternative Market Segments", pp. 1-23, 1998.
Ulwick, "The Intellectual Revolution, Applying Advanced Technology to Strategy Formulation, Planning and Decision Making", Strategyn, Inc., Manuscript Version 030698, pp. 1-166, 1997.
Notice of Allowance mailed Mar. 1, 1999 from U.S. Appl. No. 08/763,668, filed Dec. 11, 1996.
Office Action mailed Dec. 16, 1998 from U.S. Appl. No. 08/763,668, filed Dec. 11, 1996.
Notice of Allowance mailed Mar. 1, 1999 from U.S. Appl. No. 08/716,948, filed Sep. 20, 1996.
Office Action mailed Sep. 17, 1998 from U.S. Appl. No. 08/716,948, filed Sep. 20, 1996.
Notice of Allowance mailed Mar. 27, 2000 from U.S. Appl. No. 09/385,661, filed Aug. 27, 1999.
Notice of Allowance mailed Oct. 11, 2007 from U.S. Appl. No. 09/652,576, filed Aug. 31, 2000.
Office Action mailed Mar. 14, 2006 from U.S. Appl. No. 09/652,576, filed Aug. 31, 2000.
Advisory Action mailed Nov. 30, 2005 from U.S. Appl. No. 09/652,576, filed Aug. 31, 2000.

(56) References Cited

OTHER PUBLICATIONS

Office Action mailed Jul. 27, 2005 from U.S. Appl. No. 09/652,576, filed Aug. 31, 2000.
Office Action mailed Jul. 26, 2004 from U.S. Appl. No. 09/652,576, filed Aug. 31, 2000.
Office Action mailed May 28, 2009 from U.S. Appl. No. 10/235,285, filed Sep. 5, 2002.
Office Action mailed Apr. 4, 2008 from U.S. Appl. No. 10/235,285 filed Sep. 5, 2002.
Search Report and Written Opinion mailed Sep. 28, 2010 from International Serial No. PCT/US2010/026858 filed Mar. 10, 2010.
Auchey, Flynn L et al., "Using PRISM to Quantify Qualitative Data," AACE International Transactions, pp. RI11-RI17, 2006.
Campion, Michael A. et al., "Neglected Questions in Job Design: How People Design Jobs, Task-Job Predictabillity, and Influence of Training," Journal of Business and Psychology, vol. 6, No. 2, pp. 169-191, Winter 1991.
Kaeli, James K., "A Company-Wide Perspective to Identify, Evaluate and Rank the Potential for CIM (Computer Integrated Manufacturing)," Industrial Engineering, vol. 22, No. 7, pp. 23-26, Jul. 1990.
Non-Final Office Action Mailed Nov. 16, 2011 in U.S. Appl. No. 12/476,160, filed Jun. 1, 2009.
Notice of Allowance mailed Apr. 19, 2012 in U.S. Appl. No. 12/476,160, filed Jun. 1, 2009.
Final Office Action mailed Jul. 2, 2012 in U.S. Appl. No. 12/592,715, filed Nov. 30, 2009.
Non-Final Office Action mailed May 10, 2012 in U.S. Appl. No. 12/563,969, filed Sep. 21, 2009.
European Patent Application No. 10751374.9, Search Report mailed May 2, 2013.

* cited by examiner

600 ⟶

| |
|---|
| Job Map 602 |
| Emotional Jobs 604 |
| Consumption Jobs 606 |
| Job Executors 608 |
| Solutions 610 |
| Gross WTP 612 |

| Job |
| :---: |
| 702 |
| Vector of Improvement |
| 704 |
| Object of Control |
| 706 |
| Importance |
| 708 |
| Gross WTP |
| 710 |

| |
|---|
| Job 802 |
| Satisfaction 804 |
| Job Executor 806 |
| Net WTP 808 |
| Cost 810 |

FIG. 8

FACILITATING GROWTH INVESTMENT DECISIONS

CROSS REFERENCE TO RELATED APPLICATIONS

This application claims priority to U.S. Provisional Patent Applications 61/310,268 filed Mar. 3, 2010, which is incorporated by reference.

BACKGROUND

Growth investments in new products and services fail frequently perhaps in part due to the application of traditional market definitions. Market sizing is normally from the perspective of the company making a product. Traditional market sizing techniques try to quantify a market opportunity by using products, technologies, and users as inputs into the calculations. This is a flaw. Total addressable market (TAM) and serviceable addressable market (SAM) are two traditional market definitions that inherently include the flaw.

Products are merely point-in-time solutions that help customers get jobs done. The jobs do not change over time, but solutions do. For example, the job of storing music has been solved with pen and paper, piano rolls, Victrolas, LPs, 8-tracks, reel-to-reel tape, cassettes, CDs, and MP3 players. The job is constant, but the solutions change over time. The traditional market definitions are flawed because they use a variable (the product) rather than a constant (the job). In order to manipulate data structures in an automated market sizing system, the data structures must, of course, include pertinent data values. Moreover, where the values are inherently flawed, increasing the complexity of a market sizing system would have a tendency to increase the flaws in a manner that would be non-transparent to a human user of the system.

The foregoing examples of the related art and limitations related therewith are intended to be illustrative and not exclusive. Other limitations of the related art will become apparent upon a reading of the specification and a study of the drawings.

SUMMARY

In various examples, one or more of the above-described problems have been reduced or eliminated, while other examples are directed to other improvements. The following examples and aspects thereof are described and illustrated in conjunction with systems, tools, and methods that are meant to be exemplary and illustrative, not limiting in scope.

A technique for performing securable market analysis involves establishing an empirically-derived structure and evaluating market size using analytical techniques within that structure. Inputs to a system that incorporates the technique can include a functional job and related emotional and consumption jobs, if any; importance levels; satisfaction levels; job executors; and willingness-to-pay (WTP). Ideally, the structure and tools facilitate a market sizing analysis that may not be possible otherwise.

Securable market advantages include accurate sizing of markets based on well-defined underserved customer needs. So securable market analysis can be used to accurately quantify both existing market and new market opportunities. And because securable market analysis is based on jobs and outcomes rather than specific product offerings, the inputs are stable, measurable, and accurate.

Securable market advantages include lower investment risk. Securable market analysis can be used before any investment in product development to lower the risk of launching the wrong product into an attractive market or launching a new product into an unattractive market.

Securable market advantages include accurate pricing. Securable market analysis enables management teams to analyze different price points based on WTP to get a job done better. It also reveals price points that would cause customers to switch to a different solution.

Securable market advantages include accurate segmentation. Securable market analysis reveals which segments of a market should be targeted. The calculations are based on job executors who are underserved and who would be willing to pay for a new solution that gets a job done better. Securable market segments are the target markets that should be pursued. Targeting other segments means a company is targeting customers who are already satisfied with their ability to get a job done.

Securable market advantages include strategic applicability. Securable market analysis is applicable to every type of growth strategy: new market growth (targeting a job for which there are no market solutions), sustaining growth (getting a job done better with an existing product), adjacent market growth (getting a related job done better), or disruptive growth (getting a job done worse with a low cost product).

BRIEF DESCRIPTION OF THE DRAWINGS

FIG. 6 depicts an example of a job data structure.

FIG. 7 depicts an example of an outcome data structure.

FIG. 8 depicts an example of a solution data structure.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
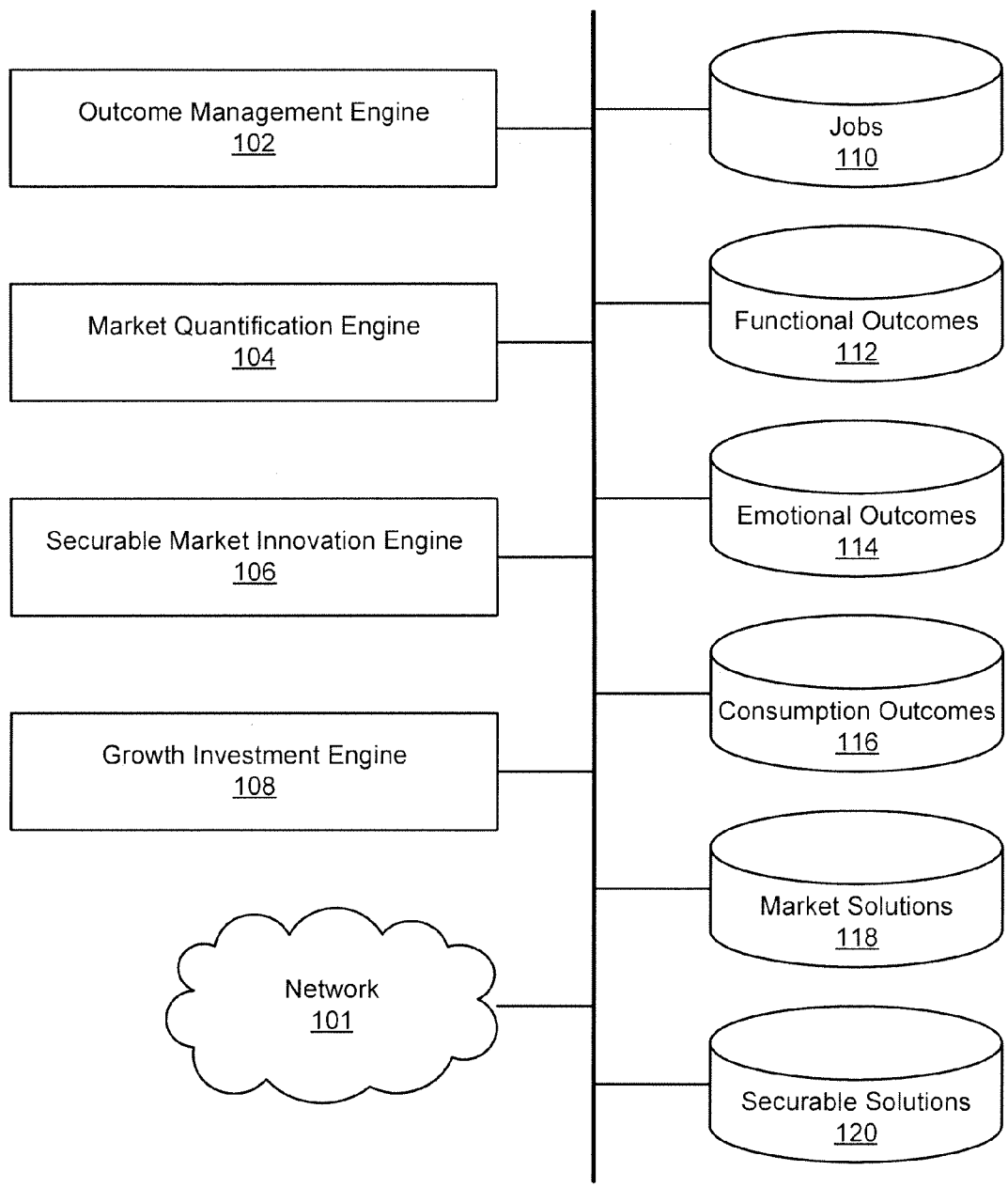
FIG. 1 depicts an example of a system for facilitating investment in a securable market.

FIG. 1 depicts an example of a system 100 for facilitating investment in a securable market. The system 100 includes a network 101, an outcome management engine 102, a market quantification engine 104, a securable market innovation engine 106, a growth investment engine 108, a jobs datastore 110, a functional outcomes datastore 112, an emotional outcomes datastore 114, a consumption outcomes datastore 116, a market solutions datastore 118, and a securable solutions datastore 120.

In the example of FIG. 1, the network 101 can include a networked system that includes several computer systems coupled together, such as a local area network (LAN), the Internet, or some other networked system. The term "Internet" as used in this paper refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. Applicable known or convenient physical connections of the Internet and the protocols and communication procedures of the Internet and the web are and/or can be used. The network 120 can broadly include, as understood from relevant context, anything from a minimalist coupling of the components illustrated in the example of FIG. 1, to every component of the Internet and networks coupled to the Internet. However, components that are outside of the control of the system 100 can be considered sources of data received in an applicable known or convenient manner.

A computer system will usually include a processor, memory, non-volatile storage, and an interface. Peripheral devices can also be considered part of the computer system. A typical computer system will include at least a processor, memory, and a device (e.g., a bus) coupling the memory to the processor. The processor can include, for example, a general-purpose central processing unit (CPU), such as a microprocessor, or a special-purpose processor, such as a microcontroller. The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory.

The bus can couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to one or more interfaces. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs to configure the general purpose systems in a specific manner in accordance with the teachings herein as specifically purposed computer systems, or it may prove convenient to construct specialized apparatus to perform the methods of some embodiments. The required structure for a variety of these systems will appear from the description below. In addition, the techniques are not described with reference to any particular programming language, and various embodiments may thus be implemented using a variety of programming languages.

Referring once again to the example of FIG. 1, the outcome management engine 102 is coupled to the jobs datastore 110, functional outcomes datastore 112, the emotional outcomes datastore 114, and the consumption outcomes datastore 116. As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The job datastore 110 includes job data structures associated with jobs that a customer needs to get done. Jobs are independent of products, and could be referred to as "product-independent jobs." Products are merely point-in-time solutions that help customers get jobs done. The jobs do not change over time, but the solutions do. For example, the job of storing music has been solved with pen and paper, piano rolls, Victrolas, LPs, 8-tracks, reel-to-reel tape, cassettes, CDs, and MP3 players. It may be noted that the existence of a job may be constrained by the technology of the time. For example, sequencing DNA, when it was new, was a job, but there were not tools to do it. At the time, the new market could have been identified even though there were no products or services to sequence DNA. As another example, the market for finding one's car was a zero-dollar solution (write parking space on a piece of paper) until a solution (use GPS) was provided. Since jobs are constant, the job data structures stored in the job datastore 110 are not uniquely associated with specific products, which generally change over time, though the inspiration to identify a job could come, at least theoretically, from any source.

A job can be characterized as the goal or task for which a solution is needed, and can include problems that need to be solved. For example, orthopedic surgeons need to replace a joint, carpenters need to make a straight cut, and IT managers need to manage software licenses. Markets can be defined based on jobs because the job is what a customer wants to accomplish, regardless of available solutions. When customers determine that they have a job to do, they look for a product or service that they can "hire" to help get the job done. If a new product is available that helps get the job done better, customers may "fire" the old product and "hire" the new one. For example, when MP3 players were introduced, consumers hired them at a rapid rate because they helped get the job of storing music done better than CDs. And when the stent was introduced, it was quickly adopted because it helped open an artery better than an angioplasty balloon alone.

Every job follows a job map, which is a series of steps that must be completed to execute the job successfully. Most jobs consist of 8-12 steps. (Emotional and consumption jobs frequently have fewer steps.) For example, in order to make a straight cut, a carpenter must plan the cut, adjust the tool, ensure safety, start the cut, operate the tool, monitor the cut, modify the cut, and finish the cut. The job map ensures that all of the steps are captured because it reveals when the job starts and ends.

The functional outcomes datastore 112 includes outcome data structures. For every job data structure in the jobs datastore 110, there is at least one outcome data structure in the functional outcomes datastore 112 that is associated with each step. Most steps consist of 6-12 outcomes. The outcomes are defined independent of a solution, and they are structured with a vector of improvement for an object of control. The vector of improvement can include a metric (e.g., time, likelihood, number, etc.) and direction of improvement (e.g., minimize, increase, etc.). The job data structure, including the outcomes at each step in the job map, enables the precise and unambiguous quantification of what a customer will need to accomplish in order to execute the job successfully. For example, in order to communicate in a dangerous situation, firefighters need to minimize the time it takes to confirm receipt of a communication. In order to make a straight cut, carpenters need to increase the likelihood that the blade will begin cutting precisely on the cut line. And in order to open an artery, cardiologists need to minimize the number of side vessels that are inadvertently entered.

The emotional outcomes datastore 114 includes outcome data structures that are similar to the outcome data structures of the functional outcomes datastore 112. Emotional jobs (and emotional outcomes) are associated with and support a functional job. Customers frequently try to get emotional jobs done as well as functional ones. For example, IT managers want to be perceived by their organization as having made significant process improvements. And musicians want to feel that they can perform new ideas without interruption. Emotional jobs are more likely than functional jobs to include fewer steps (e.g., one step) and fewer outcomes per step (e.g., one outcome). Emotional jobs could be indirectly related to specific functional jobs (e.g., the emotional job could be associated with a position within an organization regardless of functional jobs that are being suggested for the organization), directly related to a functional job (e.g., the emotional job could be associated with one or more surgical jobs), or associated with a functional outcome (e.g., the emotional job could be associated with outcomes that have to do with safety). There are advantages in using similar data structures for both functional and emotional outcomes.

The consumption outcomes datastore 116 includes outcome data structures that are similar to the outcome data structures of the functional outcomes datastore 112. Consumption jobs (and consumption outcomes) are associated with and support a functional job. Customers frequently have to expend resources to prepare to accomplish a job. For example, a purchase decision maker may need to consider the resources consumed by installing, learning to use, interfacing with, maintaining, etc. a solution associated with a functional job. Consumption jobs are more likely than functional jobs to include fewer steps (e.g., one step) and fewer outcomes per step (e.g., one outcome). Consumption jobs could be indirectly related to specific functional jobs (e.g., the consumption job could be associated with a position within an organization regardless of functional jobs that are being suggested for the organization), directly related to a functional job (e.g., the consumption job could be associated with one or more surgical jobs), or associated with a functional outcome (e.g., the consumption job could be associated with outcomes that have to do with safety). There are advantages in using similar data structures for both functional and consumption outcomes.

Since there are normally 8-12 steps and 6-12 outcomes per step, most functional jobs include 48-144 different functional outcomes, plus consumption and/or emotional outcomes. This reveals that markets are more complex than traditionally thought. The identification of jobs debunks the widespread myth that customers have latent needs. Customers know what jobs they are trying to get done and how to measure success. With the right techniques, it is possible to uncover all customer needs (even those that may be unarticulated) in any market, even those in which no products exist. It is also possible to accurately size market opportunities, including new market opportunities, if sufficiently sophisticated tools are developed to take advantage of these observations.

As described in this paper, it is assumed that the jobs datastore 110 is relatively static. That is, jobs have already been identified and entered in the relevant format and since jobs do not change over time there is theoretically no need to update them. Of course, perfection is rarely achieved in practice. The outcome management engine 102 could facilitate the addition of new job data structures when new jobs are identified, the modification or deletion of existing job data structures (presumably because the job data structure was flawed in some way, since jobs are relatively static), or otherwise manage data in the jobs datastore 110.

In addition, jobs can have an associated importance that varies over time and an associated "willingness to pay" (WTP) that also varies over time. WTP for a job or outcome represents the amount that a customer would be willing to pay for a job or outcome that is executed with "perfect" satisfaction. In one implementation, WTP can be referred to as "maximum WTP" because it represents the maximum price a job executor would pay for a solution that is 100% satisfactory. Where a distinction is intended to be drawn, WTP derived in association with jobs or outcomes can be referred to as "outcome-driven WTP" or simply "WTP" whereas WTP derived in association with specific products could be referred to as "product-specific WTP" or "traditional WTP."

Traditional techniques use hypothetical responses from customers to determine a hypothetical WTP in association with a product or selection of products. A problem with traditional WTP is that it is subject to uncertainty and bias, which tends to reduce accuracy. In order to develop a more accurate WTP, a technique should address issues of performance uncertainty, preference uncertainty, hypothetical response bias, strategic response bias, and purchase control divergence. Using rigorously defined jobs and outcomes facilitates the development of a technique to reduce uncertainty and bias in WTP.

Using a range for WTP (or reservation price) is effective at increasing the accuracy of direct elicitation surveys. The technique is known as ICERANGE (for incentive-compatible elicitation of a consumer's reservation price range), and it builds on techniques that have lowered the likelihood of hypothetical and strategic bias. With the ICERANGE technique, respondents can be rewarded for telling the truth and penalized for lying, and respondents are made aware that there is no link between their stated WTP and the price they may need to pay. The problem with the ICERANGE technique is that it involves analysis of a product. By analyzing jobs and outcomes instead of products, hypothetical and strategic bias can be reduced by making it even clearer to respondents that their WTP is not associated with an actual product price.

Figure 2:
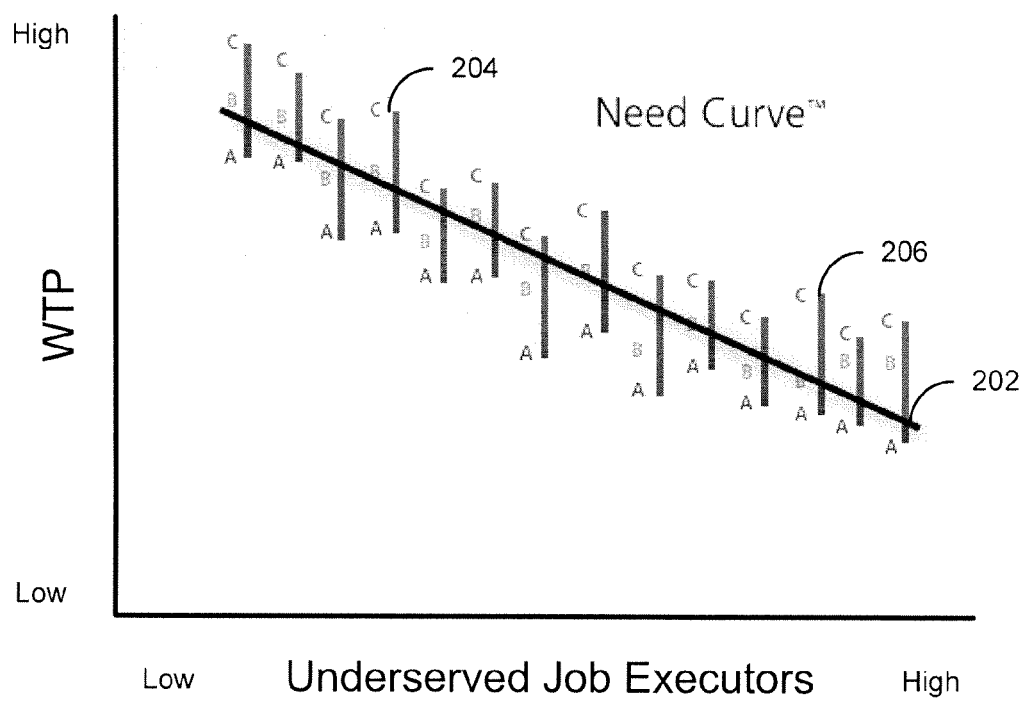
FIG. 2 depicts a graphical representation of a need curve.

When determining WTP, it may be desirable to establish a WTP range from a maximum price, A, to an indifference price, B, to a ceiling price, C, for each survey respondent. To graphically illustrate a need curve, line segments associated with each survey respondent can be placed on a grid as illustrated in the example of FIG. 2. A line drawn through the line segments ABC can be referred to as the need curve 202. The need curve 202 is the range of WTP corresponding to the number of underserved job executors. The need curve 202 is an accurate representation of the price customers will pay to get a job done better. It reflects market opportunity because it segments customers into different price categories and enables sizing of those segments. It should be noted that the need curve 202 is similar to a traditional demand curve, plotting price against quantity, but the need curve 202 is associated with WTP and number of underserved job executors.

In the example of FIG. 2, the line segments 204, 206 are representative of the number of job executors with a WTP in the indicated range. Since the line segment 204 is higher along the WTP axis than the line segment 206 and lower along the Underserved Job Executors axis, the line segment 204 is associated with a higher WTP for which fewer job executors would pay relative to the lower WTP for which more job executors would pay of line segment 206.

Depending upon context, it may be noted that WTP could be indicative of the willingness-to-pay of a specific job executor. Thus, context could vary the meaning of WTP. For example, with reference to FIG. 2, a respondent's WTP can be associated with a maximum price for which the respondent would purchase a solution (A), a ceiling price above which a respondent would never go (C), some value in between (B), or a range (e.g., A-C). For illustrative clarity, henceforth when referring to WTP in this paper, WTP shall be indicative of the willingness-to-pay of job executors considered in the aggregate (by combining the individual scores in a convenient manner), unless context dictates otherwise.

Preference and performance uncertainty issues arise in traditional elicitation surveys because customers are asked about their WTP as it relates to a specific product. Customers have preference uncertainty because when a product is being analyzed, the customer has to figure out on their own if the product's features address the right outcomes. Without explicitly stating which outcome the feature is supposed to address, customers will have a relatively high degree of uncertainty about the product's benefits. Customers have performance uncertainty because when a product is being analyzed, the customer has to figure out how well the product's features satisfy the outcomes. Without explicitly stating which outcome a features is supposed to address, customers have to come to their own conclusions about the satisfaction levels they can expect the product to achieve while executing the job. Preference and performance uncertainty exist because traditional techniques are unable to clearly state for the customer what the job is that the product is supposed to help execute and what the outcomes are that the product's features are supposed to satisfy.

In order to solve this problem and reduce both preference and performance uncertainty, customers can be asked to analyze a job—including associated consumption jobs and emotional jobs, if applicable—and its outcomes. Including associated consumption jobs and emotional jobs facilitates development of a quantitative metric on everything a customer needs to accomplish in order to get the job done, and improves the accuracy of WTP. Including associated emotional jobs can tap into non-functional needs of the job executor. When the job is quantified and outcomes are explicitly shown to a customer, uncertainty can be reduced. To accomplish this goal, job data structures and outcome data structures should have rigorous structural requirements. The outcome data structures described in this paper include a vector of improvement (including a direction of improvement and a metric of improvement) and an object of control, which is sufficiently rigorous to enable precise and unambiguous quantification of what customers need to accomplish to execute a job successfully, in practice resulting in reduced performance and preference uncertainty.

In consumer markets, the job executor is frequently both the purchase decision maker and the job beneficiary. In business markets, the job executor is often far removed from the purchase decision maker, which means there is relatively large purchase control divergence. A product is purchased to execute a functional job, but the product must also satisfy consumption jobs (e.g., purchase, install, learn-to-use, maintain, etc.). In situations where there is a large purchase control divergence, the purchase decision maker is executing one or more of the consumption jobs, including the purchase job. In order to mitigate the risk that purchase control divergence leads to inaccurate WTP analysis, the population of consumption job executors as well as functional job executors can be sampled, which can include analysis of the degree to which the job executor has influence over the purchase decision maker. By sampling both the job executor and the purchase decision maker, WTP is more accurate; by revealing the functional job to the purchase decision maker, the decision maker can also have a better understanding of the true execution costs and risks involved. Also, by sampling the purchase decision maker, it is possible to derive a quantitative value for the constraints that might limit WTP, such as budgetary or regulatory constraints.

Referring once again to the example of FIG. 1, as described in this paper, it is assumed that the functional outcomes datastore 112, the emotional outcomes datastore 114, and the consumption outcomes datastore 116 are relatively static. Outcomes can have associated importance and WTP and the importance and WTP of jobs can be computed by aggregating the importance and WTP of outcomes that make up the jobs, potentially modified by the job or job type. For example, the importance of a particular outcome that is identical in a first and second job may have greater importance and/or associated WTP in the first job than in the second job. For illustrative simplicity, the importance and WTP are generally described in this paper in direct association with the outcomes data structures and are indirectly described in association with the jobs data structures; the importance and WTP of the jobs are treated as an aggregate of the importance and WTP of the outcomes that make up the job, with the understanding that a job could modify the importance and/or WTP of an outcome in a manner that is in some way job-dependent.

The market quantification engine 104 can access the jobs datastore 110, the functional outcomes datastore 112, the emotional outcomes datastore 114, and the consumption outcomes datastore 116. In addition, the market quantification engine 104 can add, modify, delete, or otherwise manage data in the market solutions datastore 118. Advantageously, the market quantification engine 104 can be running to continuously identify markets using potentially changing data points. As data points change, the market quantification engine 104 can calculate attractive markets for investment. Since the market is, as used in this paper, a (product-independent) job and a job executor, it is possible to identify markets for investment that do not even exist. Markets that do exist will have market solutions (e.g., products and services) that accomplish, with varying levels of satisfaction, jobs for job executors. To obtain the market data, it is likely that the securable market determination engine will be coupled to the network 101 and obtain data from data sources (not shown) coupled to the network 101.

The market quantification engine 104 can store market solution data structures in the market solutions datastore 118. Market solutions are products and services that enable job executors to get jobs done or get them done better (e.g., faster, cheaper, etc.). Market solution data structures are augmented in practice by collecting other relevant data. For example, after a target market is identified, it may be advantageous to identify customers in a customer chain who may potentially be involved with any aspect of the job (e.g., raw material provider, parts supplier, manufacturer, OEM, distributor, retailer, service provider, purchase decision-maker, job executer, job beneficiary, and education/training), particularly those customers that are most likely to be unsatisfied and/or on whom success depends. It is useful to know the frequency jobs/outcomes are performed, the general satisfaction with existing solutions, the cost of existing solutions (both in terms of payment to hire the solution and in terms of overhead).

The outcome management engine 102 can work in conjunction with the market quantification engine 104 to augment the jobs datastore 110, the functional outcomes datastore 112, the emotional outcomes datastore 114, and/or the consumption outcomes datastore 116 when the market quantification engine 104 obtains new market data. For example, the market quantification engine 104 can capture desired outcomes for relevant jobs in a target market. The market quantification engine 104 can consider a market (a job), the number of job executors and their various outcomes, and the WTP for a new solution, and the outcome management engine 102 can update, e.g., the functional outcomes datastore 112 accordingly. A target market can be defined as a dollar estimate that is related to the number of job executors times the number of job executors' WTP. The market quantification engine 104 can use a job map for each job to assist in the analysis required to identify outcomes. The market quantification engine 104 can also perform or prompt for quantitative market research to capture importance and satisfaction levels customers place on each outcome, which the outcome management engine 102 can use to update, e.g., the functional outcomes datastore 112. This can improve the quality of the data available to the securable market innovation engine 106.

The securable market innovation engine 106 analyzes relevant data in the jobs datastore 110, the functional outcomes datastore 112, the emotional outcomes datastore 114, and the market solutions datastore 118 to generate at least one securable market solution data structure. This can include identifying where a market is under- and over-served and/or identifying segments of opportunity. The securable market innovation engine 106 can calculate cost target ranges, as well as timing targets using individual and portfolio factors.

The securable market innovation engine 106 can store securable market solution data structures in the market solutions datastore 118. Advantageously, the securable market solution data structures can have substantially similar formats relative to the market solutions data structures in the market solutions datastore 118. This enables comparisons between current market solutions and market solutions that do not yet exist. Non-existent market solutions can generally be characterized as targets for innovation, of which securable solutions are a subset. In addition, each securable solution data structure can have an associated outcome premium, either as part of the data structure, stored in association therewith, or determinable using data associated with the data structure. There may also be a switching cost associated with each market solution data structures in general, but most interestingly with each securable solution data structure (because the switching costs may be an issue for consumers switching from a current market solution to the securable solution). Switching costs can vary depending upon consumer-specific, current solution-specific, or other factors. For example, if a consumer is tech savvy and the new solution requires some tech savvy, the switching cost may be lower than for a consumer that is not tech savvy and for which training time is increased. As another example, if a consumer has a computer network infrastructure and the new solution requires the use of a computer network, the switching cost may be lower than for a consumer that does not have adequate computer system infrastructure.

The securable market innovation engine 106 can, if implemented to enable it, run automatically to compare market solutions to job and functional outcome metrics to compute securable solution data structures. Regardless of whether the engine automatically generates securable solution data structures, the growth investment engine 108 facilitates the selection of securable solutions that have an associated positive premium. Conceptually, the securable solution data structures can be considered part of the securable solutions datastore 120. The selected securable solutions can be used to make decisions to invest in the development of a product with the intention of the product matching the securable solution data structure.

Figure 3:
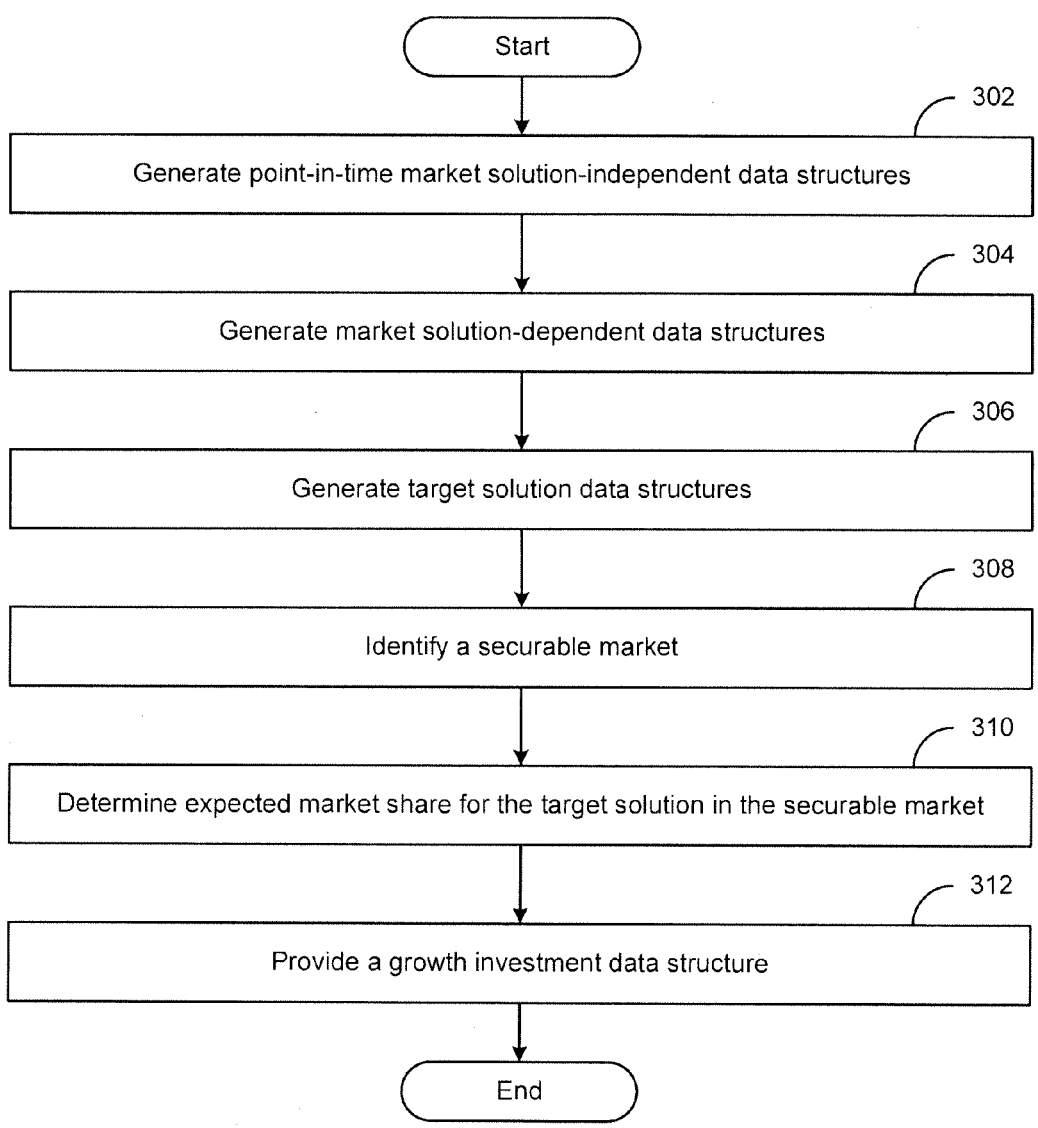
FIG. 3 depicts a flowchart of an example of a method for facilitating investment in a securable market.

FIG. 3 depicts a flowchart 300 of an example of a method for facilitating investment in a securable market. This flowchart and other flowcharts are depicted in the figures of this paper as serially arranged modules. However, modules of the flowcharts may be reordered or arranged for parallel execution as appropriate.

In the example of FIG. 3, the flowchart 300 starts at module 302 with generating point-in-time market solution-independent data structures. In a specific implementation, the module 302 could be accomplished by an outcome management engine, such as is described with reference to FIG. 1. Generating data structures can entail receiving data (potentially including data in a data structure that is identical to the data structure to be generated, which could also be referred to as "receiving market solution-independent data structures") and storing the data as a data structure in a datastore. Market solution-independent data structures include job data structures. Each job data structure is associated with a task to be accomplished, a goal to be reached, a problem to be solved, or the like. Job data structures can include functional job data structures, consumption job data structures, and emotional job data structures.

Each job data structure is relatively static in the sense that jobs are identified independently of any solutions that are currently available to accomplish the job. Of course, it may be desirable to consider a subset of job types, which could entail deleting job data structures that have been established, but in this paper it is generally assumed that once a job data structure is generated, it is not deleted even if it is irrelevant in a particular context. Also, if new jobs are quantified, data structures associated with the new jobs can be added to the existing set of job data structures, but those new jobs then become relatively static, as well. It should be noted that extant job data structures can be modified, though ideally job data structures do not have to be modified (thus, the term "static" is intended to represent a theoretical ideal, but in practice will likely simply represent the fact that the static data structures are point-in-time market solution-independent).

Jobs may or may not be divided into steps, each step including one or more outcomes. Due to the relative complexity of job data structures, human operators may find it useful to have the dozens of outcomes divided into steps to enable an abstraction of the process in some situations. It may also be considered useful to have values of outcomes (such as importance, WTP, etc.) modified by similar values that are associated with a step. That is, a particular outcome that is part of a first step may have greater importance than the same outcome that is part of a second step. Since steps are not essential to understanding the techniques described in this paper, steps can be considered an implementation choice that will be largely ignored in this paper, in favor of the use of job data structures and the outcome data structures that are associated with the job data structures.

Jobs have an associated job map that includes one or more outcomes. So, conceptually, a job is different from an outcome even if the job has a single outcome, at least because the job has an associated job map. A single-outcome job may or may not be identical to an outcome, but for illustrative purposes, jobs, which include a job map, are not outcomes, which do not. Accordingly, a job data structure includes a job map data structure that identifies outcomes (and optionally steps) and an outcome data structure does not include a job map data structure.

Outcomes can have multiple associated values, including importance, job executors, and WTP, and can be defined in association with an object of control and vector of improvement (a metric and direction of improvement). Although outcomes can be defined independent of available solutions, market analysis can lead to changes in values associated with outcomes, such as importance. Importance can be associated with an outcome; outcome data structures can include an importance quantity. However, outcomes in different jobs may or may not have different importance levels; so each outcome data structure can have a different associated importance quantity, depending upon the context. Also, outcomes may have different importance levels to different individuals (e.g., a job executor and a purchase decision-maker); so the importance associated with a job data structure could be an aggregate of different parties involved in execution of a job, in addition to being an aggregate of multiple different job executors. Importance can be obtained through interaction with current job executors, but importance is ideally relatively constant across all market solutions. That is, the importance of an outcome of a job should be the same for all market solutions for the job within a given context.

It is valuable to determine the number of job executors of a particular job to estimate market size. An accurate count of job executors can be replaced with an estimate, particularly if the number of job executors is known to be higher than some threshold profitability value or if the job does not yet have any market solutions, and it is often the case that some estimation of the number of job executors is needed. Each job executor has an associated job frequency, which is the number of times the job executor performs a job in a unit of time. In an alternative, job executor data could be completely replaced with job frequencies, though it is expected that maintaining a job executor data structure (as opposed to only a job frequency data structure) will be useful in other aspects of market sizing and implementation of solutions. So job executor data structures will generally include a job frequency value as well as an association (e.g., a link) to the job executed by the job executor, plus an association (e.g., a link) to the market solution utilized to accomplish the job, if any. The number of job executors is market solution-independent, but may be discovered when performing market analysis. That is, market analysis may determine that job executors are attempting to accomplish jobs using available point-in-time market solutions, but the number of job executors is relatively static.

WTP can be associated with a job and, for example, can be associated with outcomes and aggregated in a convenient fashion to yield a WTP in association with the job. It is possible to at least determine values within a reasonable range of certainty using applicable known or convenient techniques to obtain data associated with markets. WTP for perfect satisfaction ("perfect WTP") can be obtained through interaction with current job executors, and represents an ideal: the WTP for a solution that delivers perfect satisfaction. For individuals, perfect WTP can vary, but the various values can be aggregated to yield a perfect WTP for a particular job or outcome, or represented as a range of values.

In the example of FIG. 3, the flowchart 300 continues to module 304 with generating market solution-dependent data structures. In a specific implementation, the module 304 could be accomplished by a market quantification engine, such as is described with reference to FIG. 1. Market solution-dependent data structures can be derived from market solution-independent data structures and market data.

WTP for a market solution, as opposed to "perfect WTP," is the WTP for a solution that helps accomplish a job at a particular satisfaction level. Thus, WTP equals perfect WTP times satisfaction, where satisfaction is a value that ranges from 0 (completely unsatisfactory) to 1 (perfectly satisfied). It may be noted that the formula shows that higher satisfaction is associated with higher WTP, but the relative monetary amounts of the WTP will not necessarily be accurately represented by this linear formula. It may be noted that the actual numeric values of satisfaction and other quantities described in this paper can be changed in any applicable convenient way. For example, satisfaction could have a value that ranges from 0 to 10, 1 to 100, or some other applicable range of values. Different market solutions could have different satisfaction levels per outcome that in the aggregate result in similar satisfaction levels for the different market solutions. So it can be useful to track satisfaction levels on an outcome-by-outcome basis for the market solution, and it may also be useful to aggregate satisfaction levels for market solutions as a whole or for steps within the market solution job map.

It may be noted that even though WTP is solution-dependent, it is possible to obtain WTP (for some hypothetical or predicted satisfaction level) for a market solution that does not exist; a solution data structure, including a satisfaction value, may or may not be associated with an actual product. A solution that is not associated with an actual product could be referred to as an "ad hoc" solution. Consider, for example, the job of finding your car after you park it somewhere. An ad hoc solution was, of course, to remember where you parked your car. Before certain technological innovations, such as GPS, the ad hoc solution was the only solution (an assumption made solely for the purpose of this example, since a pen and paper could be used, as well). For the purposes of this paper, the ad hoc solution is treated as market solution dependent even if the ad hoc solution is not a product.

In this paper satisfaction, like WTP, is treated as a value associated with an outcome of a market solution (i.e., it is solution-specific) even if the market solution does not exist, and importance, like perfect WTP, is treated as a value associated with an outcome of a job (i.e., it is solution-independent). Every solution data structure is associated with a job data structure; so every solution data structure will also have an associated importance.

Cost can include multiple buckets. There are costs associated with current payments for a market solution, costs associated with current overhead (e.g., resource consumption associated with using the current market solution), and switching costs (e.g., resource consumption associated with switching to a target solution). It may be useful to keep the costs categorized, and the costs could be even more finely categorized (e.g., the switching cost could be divided into the sub-categories setup cost, installation cost, training cost, time to switch, required infrastructure investment, etc.). Various costs can be represented as consumption jobs. In general, costs are associated with market solutions, but, as is generally assumed in this paper, costs can be associated with market solutions that do not exist.

Derived market solution-dependent quantities can include dissatisfaction, which can be represented as $d=1-s$, where $0 \leq d \leq 1$ is dissatisfaction and $0 \leq s \leq 1$ is satisfaction. More complex derivations include opportunity: $O=i+\max(i-s,0)$, where O is the opportunity score, $0 \leq i \leq 1$ is importance, and $0 \leq s \leq 1$ is satisfaction. Importance is associated with a job outcome data structure, as opposed to a market solution outcome data structure. Satisfaction is associated with a market solution outcome data structure, as opposed to a job outcome data structure. The opportunity score represents a potential growth investment for a target solution that replaces or competes with a current market solution. The opportunity score is an accurate representation of where a market is underserved, appropriately served, and over-served. An underserved market has relatively high importance and relatively low satisfaction levels, whereas an over-served market has relatively low importance and relatively high satisfaction levels.

A market solution can be offered as a job solution, as opposed to an outcome solution. Thus, it can be desirable to have a way to represent the Opportunity Score of the job as a whole. An Opportunity Score for an outcome of a job can be weighted by dividing the Opportunity Score of the outcome by the sum of all of the Opportunity Scores for outcomes of the job. As used in this paper, the Opportunity Score for the job is the sum of Weighted Opportunity Scores associated with the outcomes of the job. Advantageously, by tweaking outcome Opportunity Scores, multiple target solution data structures can be generated, and their weighted Opportunity Scores analyzed, in a manner that is not possible using traditional market valuation techniques.

Another relatively complex derivation is finding a securable population. The derivation is complex relative to traditional market sizing techniques that use only existing market solutions and users of those solutions (plus the debunked myth of latent needs), and may even be impossible using traditional market sizing techniques. In this paper, $p=j*i*d$, where p is the securable population, j is the number of job executors, $0 \leq i \leq 1$ is the importance, and $0 \leq d \leq 1$ is dissatisfaction. The Securable Population accurately reflects the segment of job executors who would accept more value in the market because they want to get a job done better.

Individual gross WTP for a job executor is defined as the job frequency for the job executor times the perfect WTP for the job. It may be noted that the individual gross WTP is based on relatively static values (the job), rather than on a particular market solution. That is, individual gross WTP equals [Job Frequency] times [perfect WTP], where both Job Frequency and perfect WTP are solution-independent. It may be useful to consider Gross WTP, which is the sum of Individual Gross WTP for a job, in order to find a useful baseline for the market segment as a whole.

Individual Net WTP equals [Job Frequency] times [WTP]. WTP is solution-dependent because it is dependent on satisfaction with a market solution. So Individual Net WTP is also solution-dependent. It may be noted that the abstract value that Individual Net WTP represents can be associated with the actual cost of the market solution used to obtain the Individual Net WTP. The cost can include the amount the job executor pays for the market solution, and ideally should include overhead associated with utilizing the market solution. The sum of the Individual Net WTP for a job yields the Net WTP for a job using available market solutions.

In the example of FIG. 3, the flowchart 300 continues to module 306 with generating target solution data structures. (Optionally, current market solutions can also be mapped to market solution data structures, which can be useful for comparisons.) In a specific implementation, the module 306 could be accomplished by a securable market innovation engine, such as is described with reference to FIG. 1. Advantageously, using techniques described in this paper, it becomes possible to generate unique, accurate target solutions that do not exist on the market, and generate them with great speed. So multiple alternative target solutions can be created for comparison with one another even though none of the target solutions exist (though one could also choose to generate only one). A useful quantity of a target solution data structure is target WTP, which is a subset of WTP. As was mentioned previously, WTP is the amount a job executor is willing to pay for a market solution that accomplishes a job with a certain level of satisfaction, and perfect WTP is a potentially theoretical market solution that accomplishes a job with perfect satisfaction. Target WTP is willingness to pay for a solution that does not exist, which can be considered a potential growth investment.

Target solution data structures can include data that varies depending upon implementation. The values will generally at least include: the associated functional job and associated emotional and consumption job(s), if any; importance levels; satisfaction levels; job executors; and WTP. As was discussed previously, some values may be directly associated with the target solution data structure (e.g., satisfaction and WTP), while others may be associated with the target solution data structure because the target solution data structure is associated with a job data structure (e.g., importance and job executors). Relevant costs can be treated as consumption jobs and relevant outcomes are included in a job map of the job data structure with which the target solution data structure is associated.

Target solution data structures can also have an outcome premium that represents the difference between the target WTP and the WTP for some other solution. That is, $p=W*(T-M)$, where p is the outcome premium, W is the WTP, T is the target solution satisfaction and M is the market solution satisfaction. This formula is applicable to both functional and emotional outcomes. In another implementation, the formula is applicable to functional, emotional, and consumption outcomes. An outcome premium can also be generated for a functional job much as the Opportunity Score, mentioned above, is weighted for a job and/or for an emotional job. Where a distinction is intended to be drawn between functional and emotional premiums, the combination can be referred to as a total premium. That is, $P\beta F+E$, where P is the total premium, F is the functional outcome premium, and E is the emotional outcome premium. Advantageously, the outcome premium is accurate relative to a particular market solution regardless of the target solution, since the target solution satisfaction level can be selected (or a full range of target solution satisfaction levels can be considered in serial or parallel). Plus, a target solution data structure can have the same format as market solution data structures.

It may be noted that in a traditional market solution innovation process, an innovator will come up with a solution and then brainstorm more options. After brainstorming to come up with all of the options, the solution set is reduced in an arbitrary manner to obtain the final target solution. Advantageously, with the approach described in this paper, market solution-independent data structures can first be generated to provide a target job, market solution-dependent data structures can be generated to provide the current solutions to the job, and the data structures can be reduced to one or a manageable number of valuable target data structures having data structures identical to the current market solution data structures and easily comparable to the job data structure that was generated at the outset.

In the example of FIG. 3, the flowchart 300 continues to module 308 with identifying a securable market. In a specific implementation, the module 308 could be accomplished by a securable market innovation engine, such as is described with reference to FIG. 1. A securable market is the pecuniary volume that could be captured if a company helps customers get a job done better. It is a function of the percentage of the total market that represents an opportunity from the perspective of the customer and independent of any solution. Securable market analysis is more accurate than traditional analysis because the inputs are well-defined, knowable, and quantifiable. Advantageously, securable market analysis enables a company to analyze the size of an opportunity before investing any capital in product development.

To understand securable markets, it is useful to understand "the need curve." For the population of job executors, the net WTP will range from low to high, which can be plotted (adjusted for switching costs) on what is defined in this paper as the need curve. This is similar to the classic economics demand curve, but is instead of plotting price and quantity, WTP and the number of underserved job executors is plotted. (As is mentioned above, the underserved job executors can be determined as an opportunity score, which is a function of the importance of a job and the satisfaction with a market solution.) The size of an opportunity is dependent on the cost of getting the job done with alternative solutions. The need curve reveals the price level below which job executors would switch to a different solution at current satisfaction levels.

Figure 4:
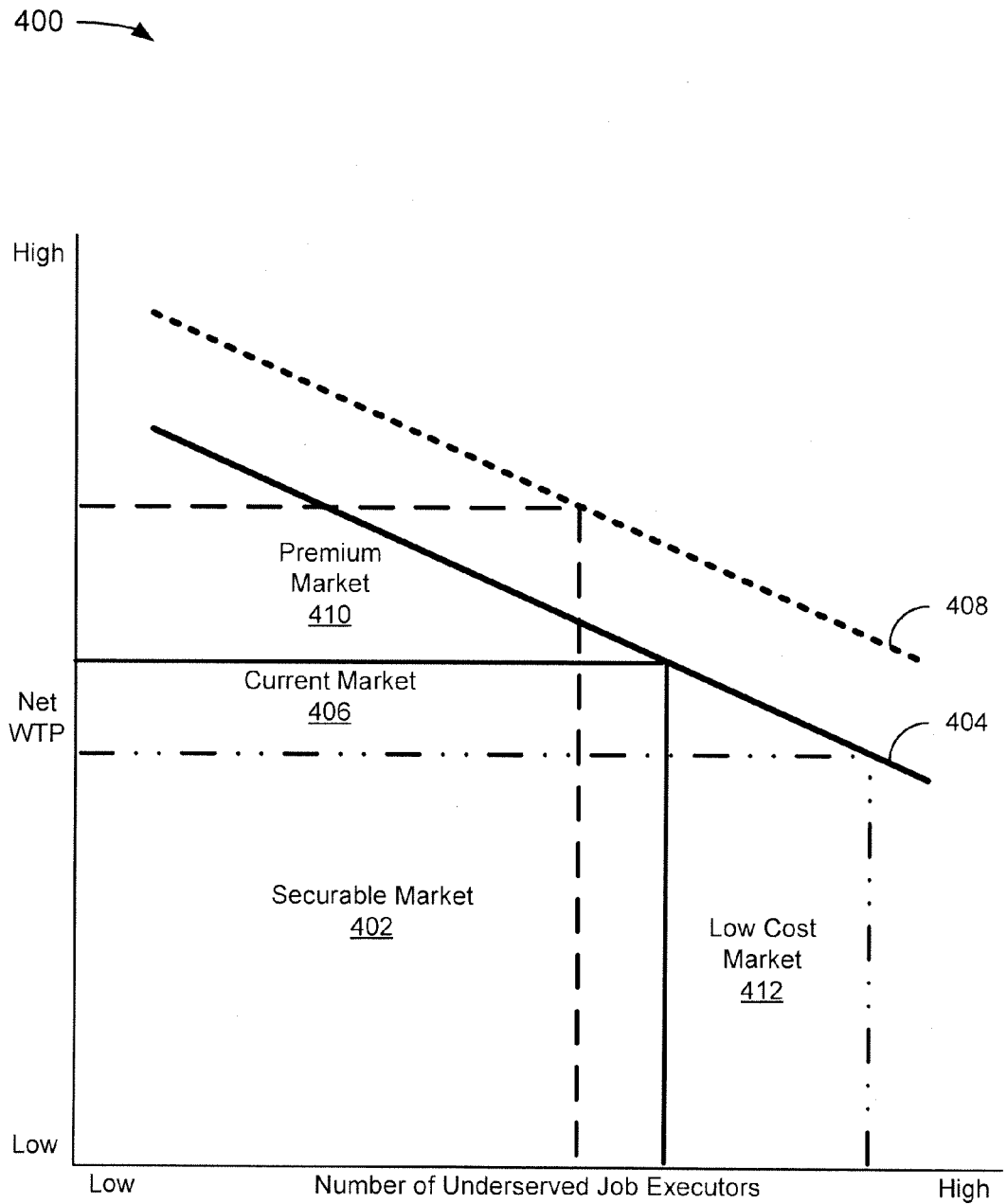
FIG. 4 depicts a graphical representation of total revenue that could be generated from new products or services that help customers get a job done at current satisfaction levels.

FIG. 4 depicts a graphical representation 400 of total revenue that could be generated from new products or services that help customers get a job done at current satisfaction levels. The representation 400 illustrates a securable market 402 in the area under the need curve 404 at the current market 406. The current market 406 is associated with a point on the need curve 404 that corresponds to a net WTP value and number of underserved job executors. The current market 406 is representative of the cost of getting a job done today. The size of the market can be grown by increasing satisfaction levels, as is represented by the increased satisfaction curve 408. The premium market 410 grows with the increased satisfaction curve over the securable market 402. (The low cost market size 412 is also depicted.) If a company can deliver a solution that increases satisfaction levels, the need curve shifts up and the market grows because job executors have a higher WTP (the premium) to get a job done quicker, with more stability, with more predictable results, etc. In other words, the size of the market opportunity cannot be increased by generating awareness, as traditional market demand function and latent need beliefs suggest.

Because job and outcome satisfaction levels for market solutions are accurately measurable, companies can use securable market analysis to analyze whether there is a bigger opportunity to grow by developing a premium product that gets a job done better. The securable market enables management teams to determine how to grow the market most efficiently in order to generate high returns with relatively low risk. Securable market analysis can also be used to analyze growth through disruption, i.e., developing a product that gets a job done worse than existing solutions but at lower cost.

Figure 5:
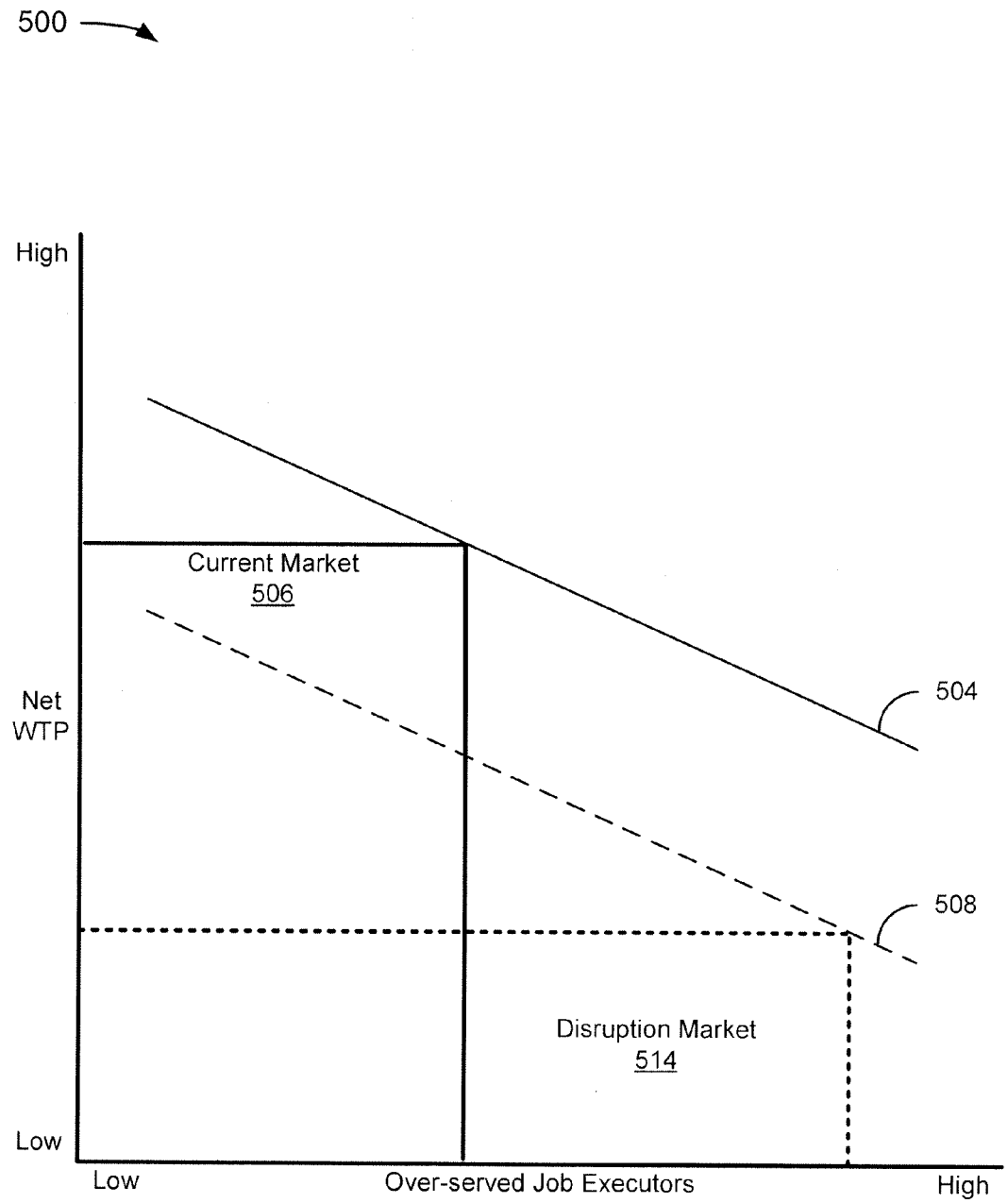
FIG. 5 depicts a graphical representation of a need curve in association with disruption market size.

FIG. 5 depicts a graphical representation 500 of a need curve in association with disruption market size. FIG. 5 is similar to FIG. 4, and also includes a current market 506, but instead of an increased satisfaction curve 408, FIG. 5 depicts a decreased satisfaction curve 508. The disruption market 514 grows from providing a solution that results in less satisfaction, but accomplishes a job at lower cost. The size of the disruption market 514 can be calculated using lower price points with lower satisfaction levels than currently exist.

Referring once again to the example of FIG. 3, the flowchart 300 continues to module 310 with determining expected market share for the target solution in the securable market. In a specific implementation, the module 310 could be accomplished by a securable market innovation engine, such as is described with reference to FIG. 1. Generally, job executors can use alternatives to get a job done, including competing and ad hoc solutions. So in order to accurately project potential market share, it is useful to try to analyze all of the competition in the market. A company can capture market share if its product adds more value for the job executor than competitive offers or alternative solutions.

Advantageously, unlike traditional market analysis, value add, A, can include a weighted average improvement in outcome satisfaction levels. Specifically, $A = (V_{new} - V_{old})/V_{old}$, where A is the added value of the new solution relative to the old solution, $V_{new}$ is the value score of a new solution, and $V_{old}$ is the value score of an old solution. The value, V, can be defined in association with a job having n outcomes as:

$$V = \sum_{i=1}^{n} S_i \frac{I_i + \max(I_i - S_i, 0)}{\sum_{j=1}^{n} I_j + \max(I_j - S_j, 0)},$$

where $I_k$ and $S_k$ are respectively the importance and satisfaction associated with an outcome k of the n outcomes of the job. Note that the numerator of the fraction is the opportunity score of an outcome, i, and the denominator of the fraction is the sum of the outcome opportunity scores for the solution.

The value scores provide a baseline assessment of a securable market. In other words, it can be determined with precision how much more satisfaction a new product has to deliver in order to capture leading market share. Every competitive product can be quantified relative to the baseline value scores of each outcome. Specifically, a value, $V_i$, for each outcome of a solution can be represented as:

$$V_i = S_i \frac{I_i + \max(I_i - S_i, 0)}{\sum_{j=1}^{n} I_j + \max(I_j - S_j, 0)}.$$

Thus, every job outcome of a solution has an opportunity score that represents the current level of importance and satisfaction, and the sum of the values for each outcome is V (i.e., the value of the solution). The weighted value score is useful because it enables quantification of the advantage of satisfying a specific outcome relative to all other outcomes in a job. For example, if firefighters need to minimize the time it takes to confirm receipt of a communication and they need to minimize the number of interruptions during a communication, it is useful to know if satisfying the confirmation outcome will add more value than satisfying the interruptions outcome.

Quantifying the value, V, of competitive products relative to the baseline value is useful because market share is rarely, if ever, distributed evenly. Experimentation with the techniques described in this paper has yielded surprising accuracy in predicting that companies with products that deliver value add of 20% or more relative to the baseline value will capture a disproportionate share of the securable market, usually between 60% and 80%. The number of solutions with value add over 20% determines the competitive intensity of the market.

Table 1 helps to illustrate how it is possible to calculate precisely how much value must be delivered (e.g., which outcomes need to be satisfied and by how much) in order to capture market share. In Table 1, C1, C2, and C3 represent competing products.

TABLE 1

| | Value Add and Competition | | | | | | | |
|---|---|---|---|---|---|---|---|---|
| | Importance | Satisfaction | Opportunity | Weight | Value | C1 | C2 | C3 |
| Outcome 1 | 8.8 | 4.4 | 13.2 | 40% | 1.7 | 1.7 | 2.1 | 2.2 |
| Outcome 2 | 6.1 | 7.4 | 6.1 | 18% | 1.4 | 2.1 | 1.9 | 1.9 |
| Outcome n | 9.0 | 4.1 | 13.9 | 42% | 1.7 | 2.0 | 2.1 | 2.2 |
| Total | | | 33.2 | 100% | 4.8 | 5.8 | 6.1 | 6.3 |
| Value Add | | | | | | 20% | 25% | 30% |

Since the size of the securable market, the value add of competitive offerings, and the competitive intensity of the market are known, it is possible to project the potential revenue for a new product with a high degree of accuracy even before investment in product development.

In the example of FIG. 3, the flowchart 300 ends at module 312 with providing a growth investment data structure. In a specific implementation, the module 312 could be accomplished by a growth investment engine, such as is described with reference to FIG. 1. By revealing precisely where the market is underserved, securable market analysis enables management teams to make better investment decisions and focus product development and R&D efforts on the right target. The growth investment data structure could be provided by having a human user select it from among the target solution data structures, its selection could be automated, or its selection could be partly automated. Providing the growth investment data structure will typically include sending the growth investment data structure to a team for further analysis, product development, or the like. Advantageously, the growth investment data structure can be provided before any investment in research and development begins, and since the market is securable, predicted revenue for the growth investment can be determined with relative precision.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise in this paper, discussions utilizing terms such as "processing," "computing," "calculating," "determining," "displaying," "generating," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Data structures are data that has been stored in a format that may vary in an implementation-specific manner, but that includes characteristics and structure necessary to accomplish the intended function. With this in mind, FIGS. 6, 7, and 8 are intended to respectively illustrate a job data structure, an outcome data structure, and a solution data structure.

In the example of FIG. 6, the job data structure 600 includes a job map 602, emotional jobs link 604, consumption jobs link 606, job executors link 608, and a gross WTP field 610. The job map 602 identifies outcomes that are associated with the job. The job map can be broken into steps, each of which includes outcomes, or the job map can include outcomes without steps. The exact structure of the job map 602 is implementation-specific, but could include, for example, an array of links to outcome data structures, an array of identifiers of outcome data structures, or some other applicable convenient structure.

The emotional jobs link 604 identifies related emotional jobs, if any. The exact structure of the emotional jobs link 604 is implementation-specific, but could include, for example, an array of links to emotional job data structures, an array of identifiers of emotional job data structures, or some other applicable convenient structure. Emotional jobs are sometimes amenable to being stored as outcomes, but emotional jobs frequently have no outcomes associated with them. As such, emotional jobs could be added as outcomes to the job map 602 or treated as something a bit different than an outcome. For example, instead of treating an emotional job as an outcome, the emotional job could be correlated with a functional job that, when accomplished or when accomplished in a certain way, increases how successful the emotional job can be considered to have been accomplished.

The consumption jobs link 606 identifies related consumption jobs, if any. The exact structure of the consumption jobs link 606 is implementation-specific, but could include, for example, an array of links to consumption job data structures, an array of identifiers of consumption job data structures, or some other applicable convenient structure. Consumption jobs are sometimes amenable to being stored as outcomes, since consumption jobs frequently have one outcome associated with them. As such, consumption jobs could be added as outcomes to the job map 602. Consumption jobs frequently have a resource associated with them, such as cost (e.g., setup costs, installation costs, training costs, switching costs, etc.) or time. The various aspects of "switching costs" could be represented in a single consumption job data structure (either as an aggregated field or as one or more fields), or represented in separate consumption job data structures.

The job executors link 608 identifies job executors of the job, if any. The exact structure of the job executors link 608 is implementation-specific, but could include, for example, an array of links to job executor data structures, an array of identifiers of job executor data structures, or some other applicable convenient structure. Job executors can also be represented as a number (i.e., the number of job executors), as groups (e.g., grouping the job executors by the solutions the job executors use to accomplish a job), or as individuals. Increasing granularity increases the ability to represent ranges of values for different job executors (e.g., along the need curve).

The solutions link 610 identifies market solutions to accomplish the job, if any. The exact structure of the solutions link 610 is implementation-specific, but could include, for example, an array of links to solution data structures, an array of identifiers of solution data structures, or some other applicable convenient structure. If useful, instead of a link, the job data structure 600 could include one or more fields associated with solutions, such as value, number of job executors using the solution, or the like.

The gross WTP field 612 identifies WTP for a solution that results in perfect satisfaction. The gross WTP field 612 is optional, and could instead be derived from WTP for specific job executors. The gross WTP field 612 can serve as a baseline for the highest WTP that could be expected for a solution to the job.

In the example of FIG. 7, the outcome data structure 700 includes a job link 702, a vector of improvement 704, an object of control field 706, an importance field 708, and a gross WTP field 710. The job link 702 provides a link to the job data structure associated with the job of which the outcome is associated. The job link 702 may be obviated in some implementations, such as if the job data structure is always used to link to the outcome data structure and no back-reference is needed. The vector of improvement 704 can include a metric (e.g., time, likelihood, number, etc.) and direction of improvement (e.g., minimize, increase, etc.). The exact structure of the vector of improvement 704 is implementation-specific. The object of control field 706 identifies the object that is being improved by the vector of improvement. The importance field 708 includes a value representative of the importance of this outcome for an associated job. The importance field 708 could include a range, and each value of the range could be associated with a job executor. However, the granularity and amount of data provided by way of the importance field 708 is implementation-specific. The importance field 708 could be omitted in a specific data structure if importance were tracked on a solution-by-solution basis (or on a job executor-by-job executor basis), but conceptually the importance may still be considered part of the outcome data structure albeit indirectly. The gross WTP field 710 identifies WTP for a solution that results in perfect satisfaction with respect to this outcome. The gross WTP field 710 is optional and could be omitted in favor of WTP that is associated with solutions to the job, rather than WTP that is associated with each outcome of a job.

In the example of FIG. 8, the solution data structure 800 includes a job link 802, a satisfaction field 804, a job executor link 806, a net WTP field 808, and cost field 810. The job link 802 provides a link to the job data structure associated with the job with which the solution is associated. The job link 802 may be obviated in some implementations, such as if the job data structure is always used to link to the solution data structure and no back-reference is needed. The satisfaction array 804 includes a value representative of the satisfaction the solution provides to job executors for each outcome. The satisfaction array 804 could include ranges, and each value of the ranges could be associated with a job executor. Instead of or in addition to the satisfaction array 804, the solution data structure 800 could include links to each outcome data structure of a job. The job executor links 806 identify the job executors who use the solution to accomplish the job. The net WTP field 808 identifies WTP for the solution, and may or may not include individual net WTP. The cost field 810 can include costs of using the solution, including time, money, or other resources, and can be broken down into convenient sub-fields in some implementations. The cost field could instead or in addition be represented as a consumption job solution.

Figure 9:
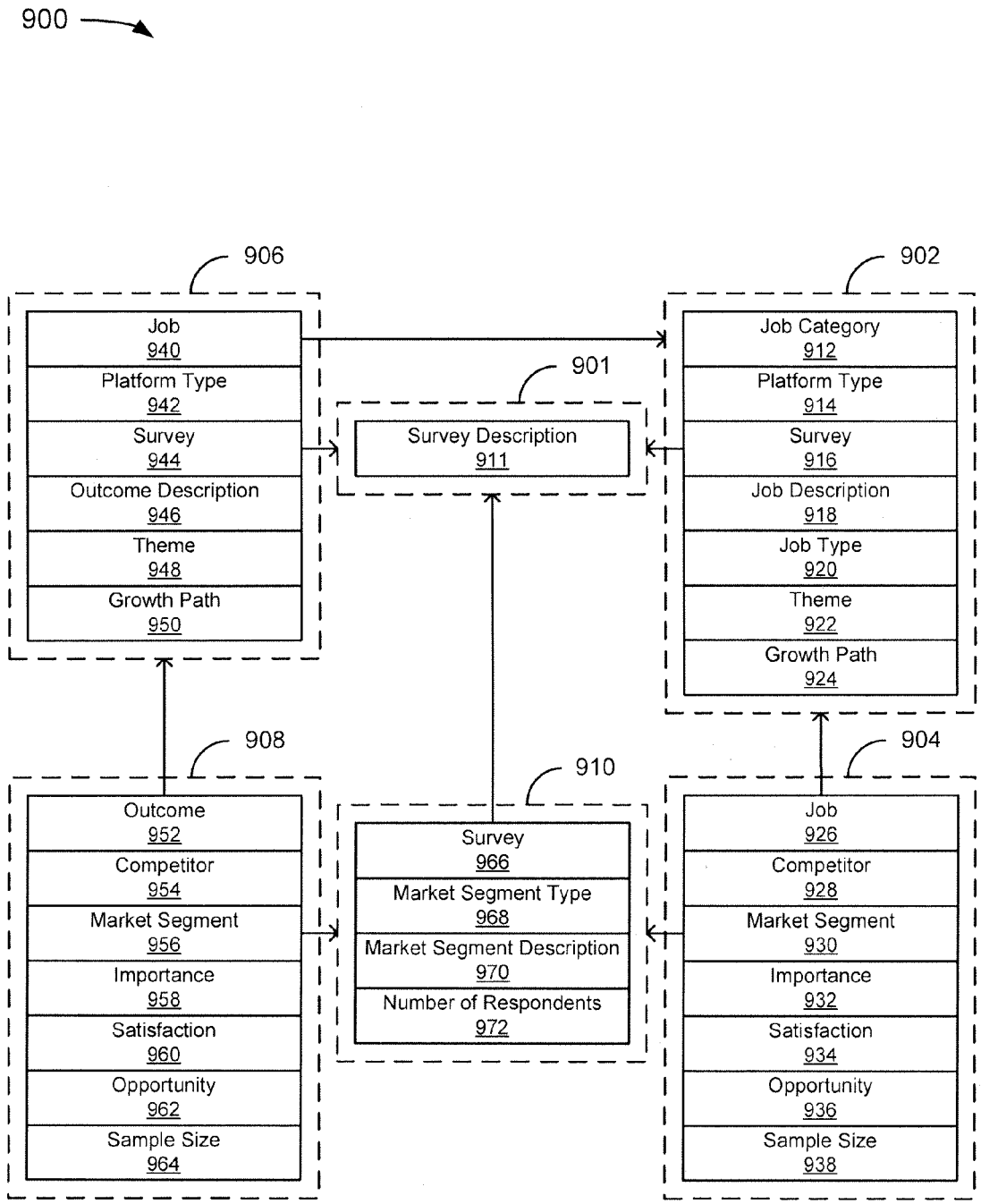
FIG. 9 depicts an example of a job data structure with substructures.

In each of the examples of FIGS. 6-8, the fields are provided by way of example and could be modified to meet the needs of a particular implementation, broken into substructures that form the indicated data structure in the aggregate, aggregated into larger data structures, or the like. FIG. 9 depicts an example of a job data structure 900 with substructures.

In the example of FIG. 9, the job data structure 900 includes a survey substructure 901, a job substructure 902, a job scoring substructure 904, an outcome substructure 906, an outcome scoring substructure 908, and a market segment substructure 910. In the example of FIG. 1, the survey substructure 901 includes a survey description field 911. In operation, the survey substructure 901 can include multiple other fields and/or substructures (not shown), such as demographics, respondents, survey question, market, company, etc. fields and/or substructures.

In the example of FIG. 9, the job substructure 902 includes a job category 912, a platform type 914, a survey 916, a job description 918, a job type 920, a theme 922, and a growth path 924. In operation, the job substructure 902 can include multiple other fields and/or substructures (not shown), such as subjobs (e.g., consumption or emotional jobs, a linked list of job steps, etc.). The job category 912 can include a field or substructure that includes, for example, a job category description, a survey id, or other fields and/or substructures. The job substructure 902 can be one of several jobs that are in the job category associated with the job category 912. The platform type 914 can include a field or substructure that includes, for example, a platform type description. A platform type can include rules and/or data that is associated with a platform for launching a product to solve the job. In the example of FIG. 9, the survey 916 points to the survey substructure 901, which was described previously. There can be multiple surveys that are associated with the job with which the job substructure 902 is associated. The job description 918 can include a description of the job with which the job substructure 902 is associated. The job type 920 can include field or substructure that includes, for example, job type description. In this example, the job type is intended to illustrate that jobs can be organized in a manner that is convenient for the users of the job structure 900. The theme 922 can include a field or substructure that includes, for example, a theme description, a survey id, etc. The theme can include a job map that includes multiple job steps and/or outcomes. The growth path 924 can include a field or substructure that includes, for example, a growth path description, a survey id, or other fields and/or substructures. The growth path can be indicative of the type of growth investment that is appropriate for a job, such as a premium growth path or a disruptive growth path.

In the example of FIG. 9, the job scoring substructure 904 includes a job 926, a competitor 928, a market segment 930, an importance 932, a satisfaction 934, an opportunity 936, and a sample size 938. There can be multiple job scoring substructures 904 for each job substructure 902. In the example of FIG. 9, the job 926 points to the job substructure 902, which was described previously. The competitor 928 can include a description of a competing solution for the job with which the job 926 is associated. In the example of FIG. 9, the market segment 930 points to the market segment substructure 910, which will be described later. The importance 932 can include a value indicative of the importance of the job 926. The satisfaction 934 can include a value indicative of the satisfaction associated with the competitor 928 that provides a solution to the job 926. The opportunity 936 can include a value indicative of a potential growth investment for a target solution that replaces or competes with a current market solution. Opportunity can be represented as a function of importance and satisfaction, where there is generally greater opportunity where importance is relatively high and satisfaction is relatively low. The sample size 938 can be indicative of the amount of data that was used to score the job 926.

In the example of FIG. 9, the outcome substructure 906 includes a job 940, a platform type 942, a survey 944, an outcome description 946, a theme 948, and a growth path 950. There can be multiple outcome substructures 906 for each job substructure 902. In the example of FIG. 9, the job 940 points to the job substructure 902, which was described previously. The platform type 942 can include a field or substructure that includes, for example, a platform type description. A platform type can include rules and/or data that is associated with a platform for incorporating into a product a solution to the outcome associated with the outcome substructure 906. In the example of FIG. 9, the survey 944 points to the survey substructure 901, which was described previously. There can be multiple surveys that are associated with the outcome with which the outcome substructure 906 is associated. The outcome description 946 can include a description of the outcome with which the outcome substructure 906 is associated. The theme 948 can include a field or substructure that includes, for example, a theme description, a survey id, etc. The theme can include a job map that includes the outcome. The growth path 950 can include a field or substructure that includes, for example, a growth path description, a survey id, or other fields and/or substructures. The growth path can be indicative of the type of growth investment that is appropriate for a job incorporating the outcome, such as a premium growth path or a disruptive growth path.

In the example of FIG. 9, the outcome scoring substructure 908 includes an outcome 952, a competitor 954, a market segment 956, an importance 958, a satisfaction 960, an opportunity 962, and a sample size 964. There can be multiple outcome scoring substructures 908 for each outcome substructure 906. In the example of FIG. 9, the outcome 952 points to the outcome substructure 906, which was described previously. The competitor 954 can include a description of a competing solution for the job with which the outcome 952 is associated. In the example of FIG. 9, the market segment 956 points to the market segment substructure 910, which will be described later. The importance 958 can include a value indicative of the importance of the outcome 952. The satisfaction 960 can include a value indicative of the satisfaction associated with the competitor 954 that provides a solution to the outcome 952. The opportunity 962 can include a value indicative of a potential growth investment for a target solution that replaces or competes with a current market solution. Opportunity can be represented as a function of importance and satisfaction, where there is generally greater opportunity where importance is relatively high and satisfaction is relatively low. The sample size 964 can be indicative of the amount of data that was used to score the outcome 952.

In the example of FIG. 9, the market segment substructure 910 includes a survey 966, a market segment type 968, a market segment description 970, and a number of respondents 972. There are generally multiple market segments associated with each job substructure 902 and outcome substructure 906. The survey 966 points to the survey substructure 901, which was described previously. The market segment type 968 is intended to illustrate that there can be multiple segment types as would be convenient to one making use of the job structure 900. The market segment description 970 can include a description of the market segment. The number of respondents 972 can include a value indicative of the number of respondents to the survey 966, and can include other data associated with respondents, such as respondent ids, respondent types, respondent roles, respondent status, respondent profiles, respondent profiles, demographics, attitudinal segments, and the like.

In the example of FIG. 9, the job data structure 900 does not distinguish between functional, emotional, and consumption jobs. Such jobs could be represented in the same or different data structures. For example, in one embodiment, financial statements can be used instead of survey data for consumption jobs (note that financial statements could be considered survey data, and are distinguished from survey data for the sake of example only). Emotional and consumption jobs could be coupled to a job data structure much as the consumption job data structure 906 is linked to the job data structure 902 in the example of FIG. 9.

Figure 10:
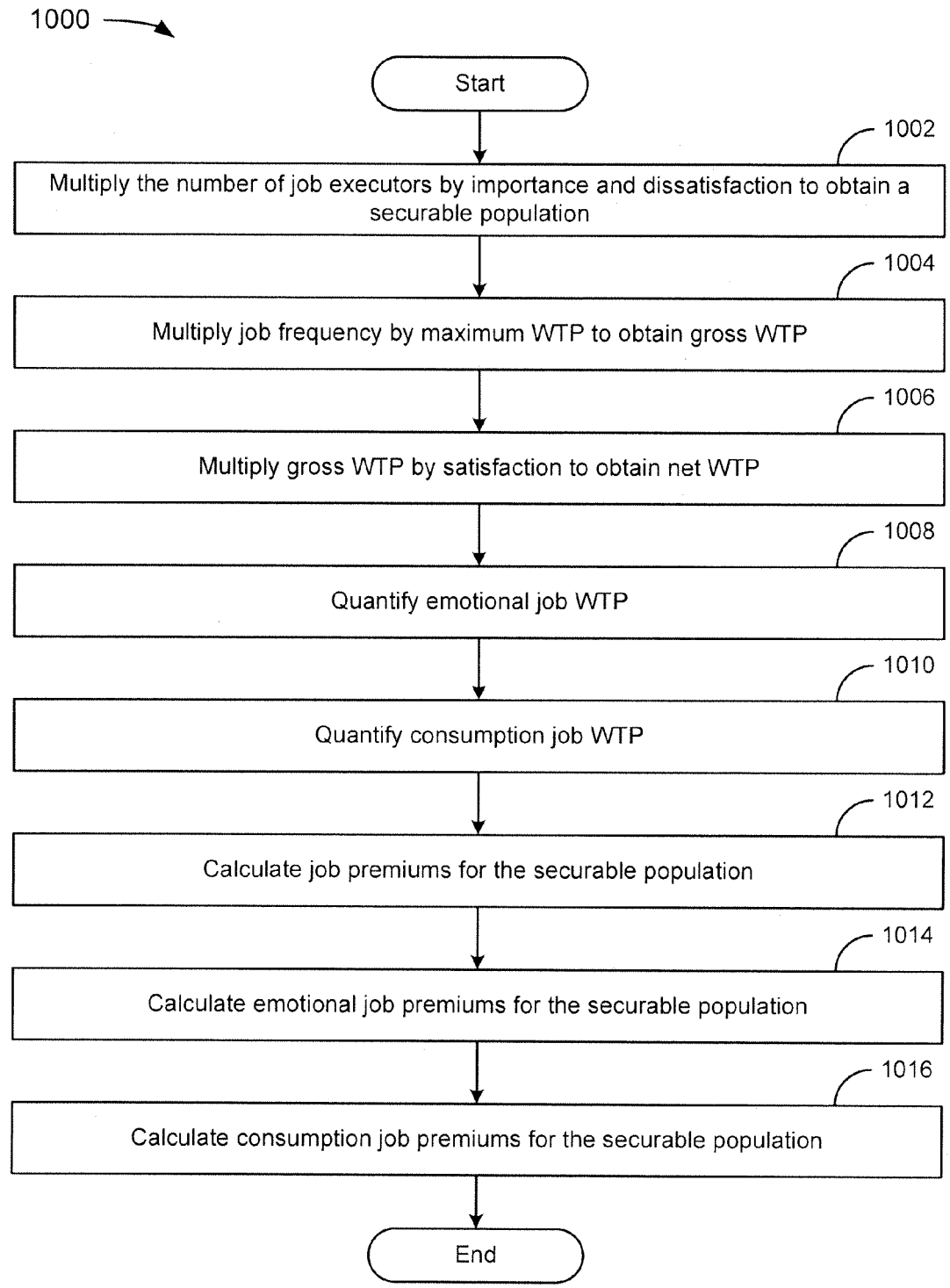
FIG. 10 depicts a flowchart of an example of a method for identifying a securable market.

FIG. 10 depicts a flowchart 1000 of an example of a method for identifying a securable market. In the example of FIG. 10, the flowchart 1000 starts at module 1002 with multiplying a number of job executors by importance and dissatisfaction levels to obtain a securable population. An appropriate formula that has been implemented in an engine for the purpose of determining a "securable population" is $p=j*i*(1-s)$, where p is the securable population, j is the number of job executors, $0 \le i \le 1$ is the importance of the job, and $0 \le s \le 1$ is the satisfaction of a target solution. Note that for maximum importance i.e., $i=1$, and maximum dissatisfaction, i.e., $s=0$, the securable population is the same as the population of job executors. This formula has proven accurate in transforming a value that is representative of a number of job executors into a value that is representative of a securable population of job executors, which is believed to be more valuable in the context of growth investments associated with the job executors.

In the example of FIG. 10, the flowchart 1000 continues to module 1004 with multiplying job frequency by maximum WTP to obtain gross WTP, which reflects the maximum price a job executor will pay to get a job associated with the job data structure done with perfect satisfaction. As such, maximum WTP can serve as an upper limit when determining the price point for a target solution to the job.

Maximum WTP can be obtained using surveys, and will likely vary depending upon the respondent. The respondents can be divided into market segments as appropriate, which could vary in size from a single respondent (in which case the maximum WTP would be as accurate as possible within the limitations of the survey) to all respondents (in which case the maximum WTP would be some combination of answers). Since it is rarely the case that all job executors can be surveyed, it is generally necessary to use other data, statistical computations, or other applicable known or convenient techniques to derive useful maximum WTP values to augment the survey data. In an alternative, maximum WTP can be estimated without the use of survey data, but accuracy is likely to suffer.

It is worth noting that sometimes the "job frequency" is equal to the number of job executors for growth investment purposes. For example, if a solution to the job "confirm receipt of a message" is being solved for a firefighter, the solution could be provided in the form of multi-use hardware that has no practical limitation on the number of times the job is carried out. So the job frequency can be equal to the number of job executors. In other cases, such as if the job "open an artery" is being solved for a cardiologist, the solution could be provided, perhaps in part, in the form of a single-use stent. So the job frequency can be some multiple of the job executors. In this paper, it is assumed that the "job executor" could represent actual job executors or some multiple, depending upon what is useful in a given context.

In the example of FIG. 10, the flowchart 1000 continues to module 1006 with multiplying gross WTP by the satisfaction with a solution to obtain net WTP. The net WTP can be associated with zero or more solutions (e.g., products or services). It is possible to have zero solutions for a job that does not yet have a market solution, in which case net WTP could be set to '0.' Where market solutions exist, surveys and/or other techniques can be used to determine satisfaction with the market solutions.

In the example of FIG. 10, the flowchart 1000 continues to module 1008 with quantifying emotional job WTP. Emotional jobs take into account, for example, the value add that a job executor will recognize for solutions that have non-functional advantages.

In the example of FIG. 10, the flowchart 1000 continues to module 1010 with quantifying consumption job WTP. Consumption jobs can include the cost of getting the job done with the relevant solution. Consumption jobs are relatively straight-forward in the sense that an enterprise may explicitly keep track of costs for performing jobs.

In the example of FIG. 10, the flowchart 1000 continues to module 1012 with calculating job premiums for the securable population, which represent WTP for satisfaction at a higher level than a current solution can deliver. Thus, the job premium will typically have a value between the net WTP of a market solution (if any) and the gross WTP for a target solution. The job premium is important for premium market analysis and is generally bounded by the gross WTP at the high end and the net WTP at the low end for a securable population. There can be multiple job premiums in comparison with multiple market solutions, or it may be convenient to compare the target solution with the highest-WTP market solution. For securable market disruption, the job premium can be lower than the net WTP.

In the example of FIG. 10, the flowchart 1000 continues to module 1014 with calculating emotional job premiums for the securable population, which represent WTP to have emotional jobs related to the job satisfied better than a current solution can deliver. Emotional job premiums and functional job premiums can be added together to obtain the total job premium, minus costs.

In the example of FIG. 10, the flowchart 1000 ends at module 1016 with calculating consumption job premiums for the securable population, which represent costs to get the job done, plus switching cost. As a general rule, switching costs reduce consumption job premiums. For securable market disruption, consumption job premiums can be considered "more important" than the total job premium, since the goal is to introduce lower-cost market solutions that will facilitate accomplishment of a job at a lower level of satisfaction than current market solutions (i.e., the total job premium can be negative).

When the flowchart 1000 ends, a combined premium associated with a target solution is available. By using the method repeatedly, it becomes possible to meaningfully compare multiple target solutions with different outcome satisfaction levels. Conveniently, due at least in part to the computation of the securable population, the combined premium has real predictive power regarding potential success of a growth initiative, compared to more traditional market analysis quantifications/computations.

What is claimed is:

1. A system comprising:
   one or more processors;
   an outcome management engine including at least one of the one or more processors;
   a securable market innovation engine, including at least one of the one or more processors, coupled to the outcome management engine;
   a growth investment engine, including at least one of the one or more processors, coupled to the securable market innovation engine;
   wherein, in operation:
      the outcome management engine generates, using at least one of the one or more processors, point-in-time market solution-independent data structures, including a job data structure and outcome data structures, wherein the job data structure is associated with a job and includes a job map having outcomes, and wherein the outcome data structures are associated with the outcomes and have importance levels that are also associated with the outcomes;
      the securable market innovation engine generates, using at least one of the one or more processors, one or more target solution data structures, including a target solution data structure having satisfaction levels corresponding to each of the outcomes, wherein the satisfaction levels quantify satisfaction with a target solution associated with the target solution data structure with respect to each of the outcomes;
      the securable market innovation engine identifies, using at least one of the one or more processors, a securable market using the point-in-time market solution-independent data structures and a function of the importance levels and satisfaction levels;
      the growth investment engine provides, using at least one of the one or more processors, a growth investment data structure associated with a growth investment targeting the securable market, wherein the growth investment data structure is associated with the target solution.

2. The system of claim 1 further comprising a market quantification engine coupled to the securable market innovation engine, wherein, in operation, the market quantification engine generates market solution-dependent data structures, including a solution data structure having satisfaction levels corresponding to each of the outcomes, wherein the satisfaction levels quantify satisfaction with a solution associated with the solution data structure with respect to each of the outcomes.

3. The system of claim 1 wherein identifying the securable market includes the securable market innovation engine multiplying a number of job executors by importance and satisfaction levels to obtain a securable population.

4. The system of claim 1 wherein identifying the securable market includes the securable market innovation engine calculating gross willingness-to-pay (WTP), which reflects a job executor's WTP to get the job associated with the job data structure done with perfect satisfaction and multiplying gross WTP by the satisfaction with the target solution to obtain net WTP.

5. The system of claim 1 wherein identifying the securable market includes the securable market innovation engine calculating job premiums, which represent willingness-to-pay for satisfaction at a higher level than a current solution can deliver.

6. The system of claim 1 wherein identifying the securable market includes the securable market innovation engine calculating emotional job premiums, which represent willingness-to-pay to have emotional jobs related to the job satisfied better than a current solution can deliver.

7. The system of claim 1 wherein identifying the securable market includes the securable market innovation engine calculating a total cost of getting the job done, plus switching costs.

8. The system of claim 1 wherein, in operation, the securable market innovation engine determines expected market share for the securable market.

9. The system of claim 1 wherein the function of the importance levels and satisfaction levels can be used to obtain an opportunity score equal to importance level plus the maximum of the importance level minus the satisfaction level and zero.

10. A system comprising:
   one or more processors;
   means, including at least one of the one or more processors, for generating point-in-time market solution-independent data structures that at least include importance of an outcome of a job;

means, including at least one of the one or more processors, for generating market solution-dependent data structures that at least include satisfaction with an outcome of a job for a market solution;

means, including at least one of the one or more processors, for identifying a securable market using the point-in-time market solution-independent data structures and the market solution-dependent data structures;

means, including at least one of the one or more processors, for generating target solution data structures, including a target solution data structure associated with a target solution that at least includes satisfaction with an outcome of a job for the target solution;

means, including at least one of the one or more processors, for determining expected market share for the target solution in the securable market based on one or more of the target solution data structures;

means, including at least one of the one or more processors, for providing a growth investment data structure based on the expected market share.

11. The system of claim 10 wherein the means for identifying the securable market includes a means for multiplying a number of job executors by importance and satisfaction levels to obtain a securable population.

12. The system of claim 10 wherein the means for identifying the securable market includes a means for calculating gross willingness-to-pay (WTP), which reflects a job executor's WTP to get the job associated with the job data structure done with perfect satisfaction and multiplying gross WTP by the satisfaction with the target solution to obtain net WTP.

13. The system of claim 10 wherein the means for identifying the securable market includes a means for calculating job premiums, which represent willingness-to-pay for satisfaction at a higher level than a current solution can deliver.

14. The system of claim 10 wherein the means for identifying the securable market includes a means for calculating emotional job premiums, which represent willingness-to-pay to have emotional jobs related to the job satisfied better than a current solution can deliver.

15. The system of claim 10 wherein the means for identifying the securable market includes a means for calculating a total cost of getting the job done, plus switching costs.

16. A method, executed on one or more processors, the method comprising:

generating, at least one of the one or more processors, point-in-time market solution-independent data structures that at least include importance of an outcome of a job;

generating, sing at least one of the one or more processors, market solution-dependent data structures that at least include satisfaction with an outcome of a job for a market solution;

identifying, at least one of the one or more processors, a securable market using the point-in-time market solution-independent data structures and the market solution-dependent data structures;

generating, using at least one of the one or more processors, target solution data structures, including a target solution data structure associated with a target solution that at least includes satisfaction with an outcome of a job for the target solution;

determining, using at least one of the one or more processors, expected market share for the target solution in the securable market based on one or more of the target solution data structures;

providing, at least one of the one or more processors, a growth investment data structure based on the expected market share.

17. The method of claim 16 wherein identifying the securable market includes multiplying a number of job executors by importance and satisfaction levels to obtain a securable population.

18. The method of claim 16 wherein identifying the securable market includes calculating gross willingness-to-pay (WTP), which reflects a job executor's WTP to get the job associated with the job data structure done with perfect satisfaction, and multiplying gross WTP by the satisfaction with the target solution to obtain net WTP.

19. The method of claim 16 wherein identifying the securable market includes calculating job premiums, which represent willingness-to-pay for satisfaction at a higher level than a current solution can deliver.

20. The method of claim 16 wherein identifying the securable market includes calculating emotional job premiums, which represent willingness-to-pay to have emotional jobs related to the job satisfied better than a current solution can deliver.

21. The method of claim 16 wherein identifying the securable market includes calculating a total cost of getting the job done, plus switching costs.

* * * * *

UNITED STATES PATENT AND TRADEMARK OFFICE
CERTIFICATE OF CORRECTION

| | | |
|---|---|---|
| PATENT NO. | : 8,583,469 B2 | Page 1 of 1 |
| APPLICATION NO. | : 13/020546 | |
| DATED | : November 12, 2013 | |
| INVENTOR(S) | : James H. Haynes, III et al. | |

It is certified that error appears in the above-identified patent and that said Letters Patent is hereby corrected as shown below:

In the Claims

Claim 16, Column 28 line 3, "generating, at least one of one or more processors, point-in-time market solution-independent data structures that at least include importance of an outcome of a job;" should be changed to -- generating, using at least one of one or more processors, point-in-time market solution-independent data structures that at least include importance of an outcome of a job; --

Claim 16, Column 28 line 7, "generating, sing at least one of one or more processors, market solution-dependent data structures that at least include satisfaction with an outcome of a job for a market solution;" should be changed to -- generating, using at least one of the one or more processors, market solution-dependent data structures that at least include satisfaction with an outcome of a job for a market solution; --

Claim 16, Column 28 line 10, "identifying, at least one of the one or more processors, a securable market using the point-in-time market solution-independent data structures and the market solution-dependent data structures;" should be changed to -- identifying, using at least one of the one or more processors, a securable market using the point-in-time market solution-independent data structures and the market solution-dependent data structures; --

Claim 16, Column 28 line 23, "providing, at least one of the one or more processors, a growth investment data structure based on the expected market share." should be changed to -- providing, using at least one of the one or more processors, a growth investment data structure based on the expected market share. --

Signed and Sealed this
Third Day of June, 2014

Michelle K. Lee
*Deputy Director of the United States Patent and Trademark Office*